US012711667B2

(12) United States Patent
Lasserre et al.

(10) Patent No.: US 12,711,667 B2
(45) Date of Patent: Aug. 18, 2026

(54) METHOD AND APPARATUS OF ENCODING/DECODING POINT CLOUD GEOMETRY DATA SENSED BY AT LEAST ONE SENSOR

(71) Applicant: Beijing Xiaomi Mobile Software Co., Ltd., Beijing (CN)

(72) Inventors: Sebastien Lasserre, Beijing (CN); Jonathan Taquet, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 260 days.

(21) Appl. No.: 18/693,598

(22) PCT Filed: Jun. 21, 2022

(86) PCT No.: PCT/CN2022/100237

§ 371 (c)(1),
(2) Date: Mar. 20, 2024

(87) PCT Pub. No.: WO2023/045443

PCT Pub. Date: Mar. 30, 2023

(65) Prior Publication Data

US 2025/0139833 A1 May 1, 2025

(30) Foreign Application Priority Data

Sep. 24, 2021 (EP) .................................... 21306322

(51) Int. Cl.
*G06T 9/00* (2006.01)

(52) U.S. Cl.
CPC .................................... *G06T 9/001* (2013.01)

(58) Field of Classification Search
CPC .. G06T 9/001; G06T 7/90; G06T 7/62; G06T 2207/10028

(Continued)

(56) References Cited

U.S. PATENT DOCUMENTS

2018/0268570 A1* 9/2018 Budagavi ................ G06T 9/001
2022/0107391 A1* 4/2022 Ren ........................ G06V 20/58

FOREIGN PATENT DOCUMENTS

CN 113160068 B * 8/2022 ............... G06T 7/50

OTHER PUBLICATIONS

Lasserre, S. et al., "m57073 [GPCC-EE13.53]Algorithmic explanation of the new Lidar Codec LL-LC2", Xiaomi, Oct. 6, 2021, 37 pages.

(Continued)

*Primary Examiner* — Jamares Q Washington
(74) *Attorney, Agent, or Firm* — Finnegan, Henderson, Farabow, Garrett & Dunner, L.L.P.

(57) ABSTRACT

A method of encoding, into a bitstream, point cloud geometry data represented by ordered coarse points occupying some discrete positions of a set of discrete positions of a two-dimensional space, includes obtaining at least one binary data ($f_j$) representative of an order index difference representative of a difference between order indices of two consecutive occupied coarse points and encoding each of the at least one binary data ($f_j$) by: obtaining coordinates ($s_j,\lambda_j$) of a current coarse point ($P_j$) within the two-dimensional space; obtaining a sensing number ($N_{sens}(s_j,\lambda_j)$) from the current coarse point ($P_j$), the sensing number ($N_{sens}(s_j,\lambda_j)$) being representative of an average number of consecutive sensing needed by a sensor ($\lambda_j$) associated with the current coarse point ($P_j$) to sense another coarse point; and entropy encoding, into the bitstream, the binary data ($f_j$) based on the sensing number ($N_{sens}(s_j,\lambda_j)$).

20 Claims, 15 Drawing Sheets

(58) Field of Classification Search
USPC ................ 382/232, 192, 199, 201, 243, 286
See application file for complete search history.

(56) References Cited

OTHER PUBLICATIONS

Extended European Search Report Issued in Application No. 21306322.5 dated Mar. 9, 2022, 8 pages.

* cited by examiner

METHOD AND APPARATUS OF ENCODING/DECODING POINT CLOUD GEOMETRY DATA SENSED BY AT LEAST ONE SENSOR

CROSS-REFERENCE TO RELATED APPLICATION

This application is a US national phase of International Patent Application No. PCT/CN2022/100237, filed on Jun. 21, 2022, which claims a priority to and benefits of European Patent Application Serial No. 21306322.5, filed on Sep. 24, 2021, the entire contents of both of which are incorporated herein by reference for all purposes.

FIELD

The disclosure generally relates to point cloud compression and, in particular to methods and apparatus of encoding/decoding point cloud geometry data sensed by at least one sensor.

BACKGROUND

As a format for the representation of 3D data, point clouds have recently gained traction as they are versatile in their capability in representing all types of physical objects or scenes. Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

SUMMARY

According to a first aspect, there is provided a method of encoding, into a bitstream, point cloud geometry data represented by ordered coarse points occupying some discrete positions of a set of discrete positions of a two-dimensional space. The method comprises obtaining at least one binary data representative of an order index difference representative of a difference between order indices of two consecutive occupied coarse points and encoding each of the at least one binary data by obtaining coordinates of a current coarse point within the two-dimensional space; obtaining a sensing number from the current coarse point, the sensing number being representative of an average number of consecutive sensing needed by a sensor associated with the current coarse point to sense another coarse point; and entropy encoding, into the bitstream, the binary data based on the sensing number.

According to a second aspect, there is provided a method of decoding, from a bitstream, point cloud geometry data represented by ordered coarse points occupying some discrete positions of a set of discrete positions of a two-dimensional space. The method comprises obtaining at least one binary data representative of an order index difference representative of a difference between order indices of two consecutive occupied coarse points by obtaining coordinates of a current coarse point within the two-dimensional space; obtaining a sensing number from the current coarse point, the sensing number being representative of an average number of consecutive sensing needed by a sensor associated with the current coarse point to sense another coarse point; and entropy decoding, into the bitstream, the binary data based on the sensing number.

According to a third aspect, there is provided an apparatus of encoding, into a bitstream, point cloud geometry data represented by ordered coarse points occupying some discrete positions of a set of discrete positions of a two-dimensional space. The apparatus comprising one or more processors configured to carry out a method according to the first aspect.

BRIEF DESCRIPTION OF THE DRAWINGS

Reference will now be made, by way of example, to the accompanying drawings which show embodiments of the disclosure, and in which.

Similar reference numerals may have been used in different figures to denote similar components.

DETAILED DESCRIPTION

Figures 1, 2:
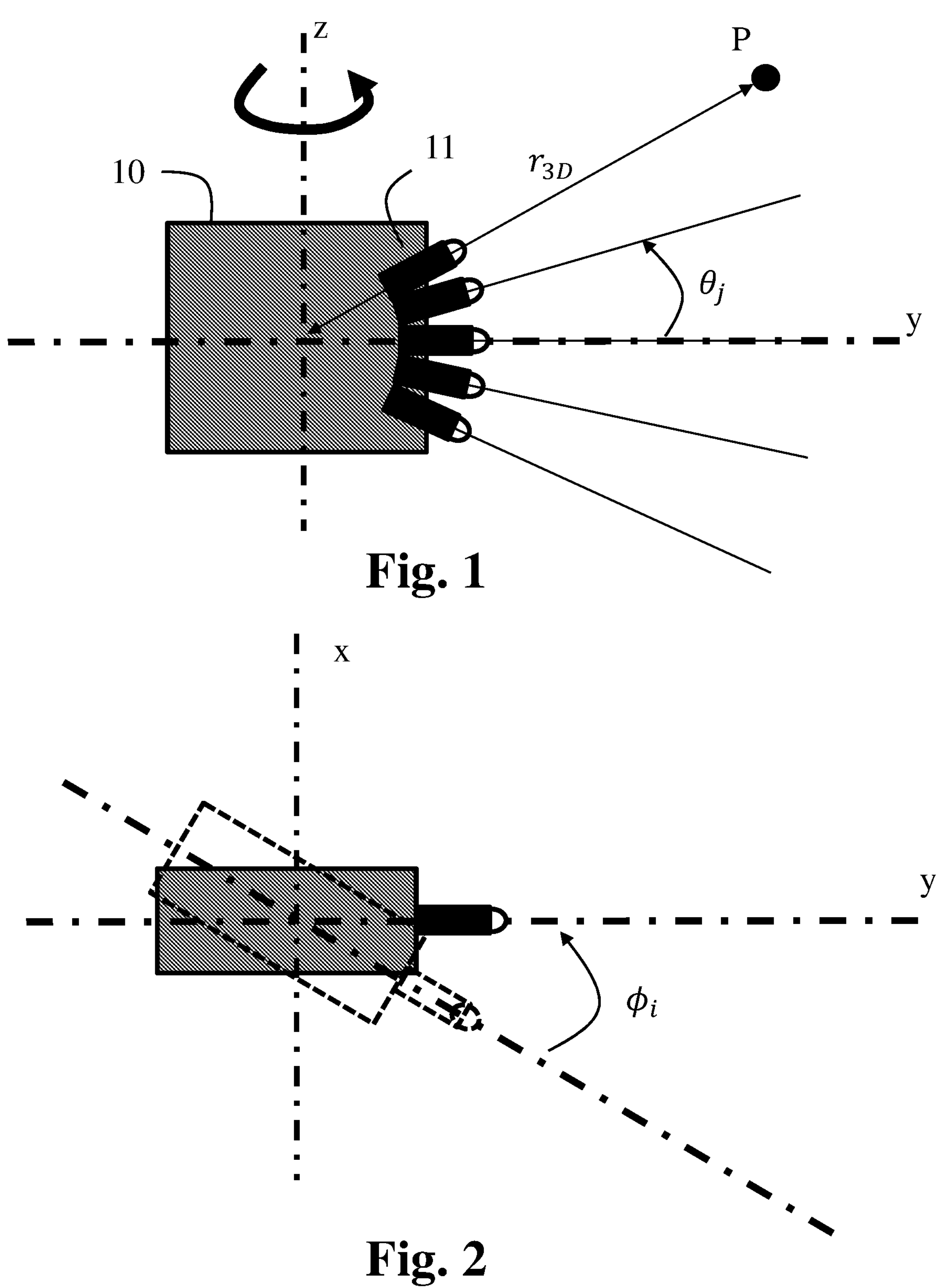
FIG. 1 shows schematically a side view of a sensor head and some of its parameters in accordance with at least one embodiment of the disclosure.
FIG. 2 shows schematically a top view of the sensor head and some of its parameters in accordance with at least one embodiment of the disclosure.

At least one of the embodiments is described more fully hereinafter with reference to the accompanying figures, in which examples of at least one of the embodiments are illustrated. An embodiment may, however, be embodied in many alternate forms and should not be construed as limited to the examples set forth herein. Accordingly, it should be understood that there is no intent to limit embodiments to the particular forms disclosed. On the contrary, the disclosure is intended to cover all modifications, equivalents, and alternatives falling within the spirit and scope of the disclosure.

As a format for the representation of 3D data, point clouds have recently gained traction as they are versatile in their capability in representing all types of physical objects or scenes. Point clouds may be used for various purposes such as culture heritage/buildings in which objects like statues or buildings are scanned in 3D in order to share the spatial configuration of the object without sending or visiting it. Also, it is a way to ensure preserving the knowledge of the object in case it may be destroyed; for instance, a temple by an earthquake. Such point clouds are typically static, colored and huge.

Another use case is in topography and cartography in which using 3D representations allow for maps that are not limited to the plane and may include the relief. Google Maps is now a good example of 3D maps but uses meshes instead of point clouds. Nevertheless, point clouds may be a suitable data format for 3D maps and such point clouds are typically static, colored and huge.

Virtual Reality (VR), Augmented Reality (AR) and immersive worlds have recently become a hot topic and are foreseen by many as the future of 2D flat video. The basic idea is to immerse the viewer in a surrounding environment, in contrast to a standard TV that only allows the viewer to look at the virtual world in front of him/her. There are several gradations in the immersivity depending on the freedom of the viewer in the environment. A point cloud is a good format candidate for distributing VR/AR worlds.

The automotive industry, and more particularly foreseen autonomous cars, are also domains in which point clouds may be intensively used. Autonomous cars should be able to "probe" their environment to make good driving decisions based on the detected presence and nature of their immediate nearby objects and road configuration.

A point cloud is a set of points located in a three-dimensional (3D) space, optionally with additional values attached to each of the points. These additional values are usually called attributes. Attributes may be, for example, three-component colors, material properties like reflectance and/or two-component normal vectors to a surface associated with a point.

A point cloud is thus a combination of geometry data (locations of the points in a 3D space usually represented by 3D cartesian coordinates x, y and z) and attributes.

Point clouds may be sensed by various types of devices like an array of cameras, depth sensors, lasers (light detection and ranging, also known as Lidars), radars, or may be computer-generated (for example in movie post-production). Depending on the use cases, points clouds may have from thousands to up to billions of points for cartography applications. Raw representations of point clouds require a very high number of bits per point, with at least a dozen of bits per cartesian coordinate x, y or z, and optionally more bits for the attribute(s), for instance three times 10 bits for the colors.

It is important in many applications to be able to either distribute point clouds to an end-user or store them in a server by consuming only a reasonable amount of bitrate or storage space, while maintaining an acceptable (or preferably very good) quality of experience. Efficient compression of these point clouds is a key point in order to make the distribution chain of many immersive worlds practical.

Compression may be lossy (like in video compression) for the distribution to and visualization by an end-user, for example on AR/VR glasses or any other 3D-capable device. Other use cases do require lossless compression, like medical applications or autonomous driving, to avoid altering the results of a decision obtained from the subsequent analysis of the compressed and transmitted point cloud.

Until recently, point cloud compression (aka PCC) was not addressed by the mass market and no standardized point cloud codec was available. In 2017, the standardization working group ISO/JCT1/SC29/WG11, aka Moving Picture Experts Group or MPEG, has initiated work items on point cloud compression. This has led to two standards, namely

- MPEG-I part 5 (ISO/IEC 23090-5) or Video-based Point Cloud Compression (aka V-PCC)
- MPEG-I part 9 (ISO/IEC 23090-9) or Geometry-based Point Cloud Compression (aka G-PCC)

The V-PCC coding method compresses a point cloud by performing multiple projections of a 3D object to obtain 2D patches that are packed into an image (or a video when dealing with dynamic point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-sensed sparse geometry data.

The G-PCC coding method has two schemes for the compression of a sensed sparse geometry data.

The first scheme is based on an occupancy tree, being locally any type of tree among octree, quadtree or binary tree, representing the point cloud geometry. Occupied nodes (i.e. a node associated with a cube/cuboid comprising at least one point of the point cloud) are split down until a certain size is reached, and occupied leaf nodes provide the 3D locations of points, typically at the center of these nodes. The occupancy information is carried by occupancy data (binary data, flag) signaling the occupancy status of each of the child nodes of nodes. By using neighbor-based prediction techniques, high level of compression of the occupancy data can be obtained for dense point clouds. Sparse point clouds are also addressed by directly coding the position of point within a node with non-minimal size, by stopping the tree construction when only isolated points are present in a node; this technique is known as Direct Coding Mode (DCM).

The second scheme is based on a predictive tree in which each node represents the 3D location of one point and the parent/child relation between nodes represents spatial prediction from parent to children. This method can only address sparse point clouds and offers the advantage of lower latency and simpler decoding than the occupancy tree. However, compression performance is only marginally better, and the encoding is complex, relatively to the first occupancy-based method, because the encoder must intensively look for the best predictor (among a long list of potential predictors) when constructing the predictive tree.

In both schemes, attribute (de) coding is performed after complete geometry (de) coding, leading practically to a two-pass coding. Thus, the joint geometry/attribute low latency is obtained by using slices that decompose the 3D space into sub-volumes that are coded independently, without prediction between the sub-volumes. This may heavily impact the compression performance when many slices are used.

Combining together requirements on encoder and decoder simplicity, on low latency and on compression performance is still a problem that has not been satisfactory solved by existing point cloud codecs.

An important use case is the transmission of sparse geometry data sensed by at least one sensor mounted on a moving vehicle. This usually requires a simple and low latency embarked encoder. Simplicity is required because the encoder is likely to be deployed on computing units which perform other processing in parallel, such as (semi-) autonomous driving, thus limiting the processing power available to the point cloud encoder. Low latency is also required to allow for fast transmission from the car to a cloud in order to have a real-time view of the local traffic, based on multiple-vehicle acquisition, and take adequate fast decision based on the traffic information. While transmission latency can be low enough by using 5G, the encoder itself shall not introduce too much latency due to coding. Also, compression performance is extremely important since the flow of data from millions of cars to the cloud is expected to be extremely heavy.

Specific priors related to spinning Lidar-sensed sparse geometry data have been already exploited in G-PCC and have led to very significant gains of compression.

First, G-PCC exploits the elevation angle (relative to the horizontal ground) of sensing from a spinning Lidar head 10 as depicted on FIGS. 1 and 2. A Lidar head 10 comprises a set of sensors 11 (for example lasers), here five sensors are represented. The spinning Lidar head 10 may spin around a vertical axis z to sense geometry data of a physical object. Lidar-sensed geometry data is then represented in spherical coordinates ($r_{3D}$, $\phi$, $\theta$), where $r_{3D}$ is the distance of a point P from the Lidar head's center, $\phi$ is an azimuthal angle of the Lidar head's spin relative to a referential, and $\theta$ is an elevation angle of a sensor k of the spinning Lidar head 10 relative to a horizontal referential plane.

Figure 3:
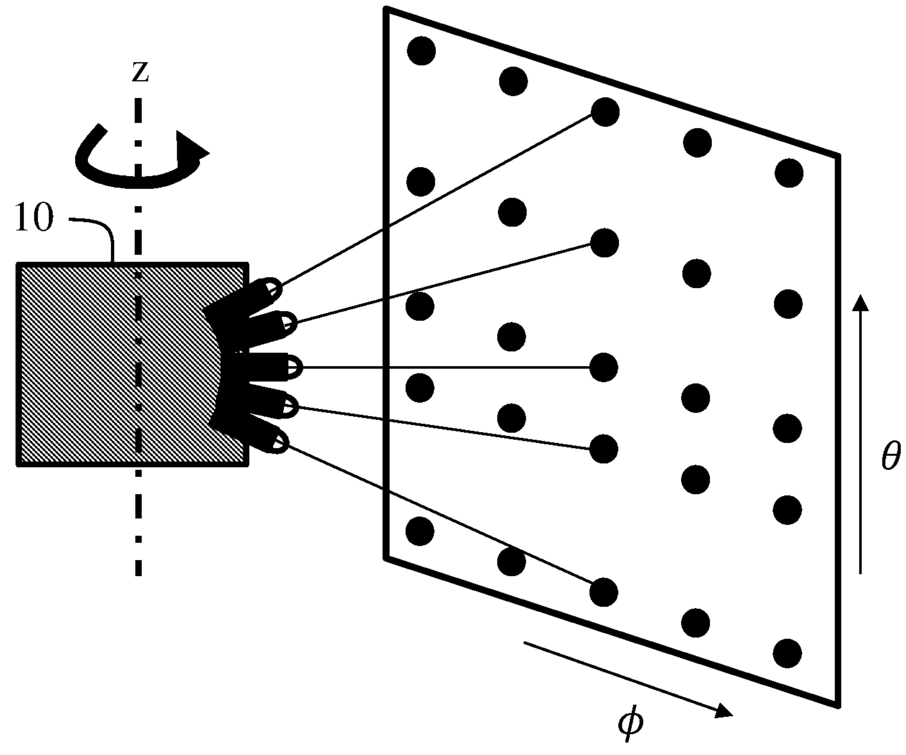
FIG. 3 shows schematically a regular distribution of data sensed by a spinning sensor head in accordance with at least one embodiment of the disclosure.

A regular distribution along the azimuthal angle has been observed on Lidar-sensed data as depicted on FIG. 3. This regularity is used in G-PCC to obtain a quasi 1D representation of the point cloud where, up to noise, only a radius $r_{3D}$ belongs to a continuous range of values while the angles $\phi$ and $\theta$ take only a discrete number of values $\phi_i \forall i=0$ to I−1 where I is a number of azimuthal angles used for the sensing of the points and $\theta_j \forall j=0$ to J−1 where J is a number of sensors of the spinning Lidar head 10. Basically, G-PCC represents Lidar-sensed sparse geometry data on a two-dimensional (discrete) angular coordinate space ($\phi$, $\theta$) as depicted on FIG. 3, together with a radius value $r_{3D}$ for each point.

This quasi 1D property has been exploited in G-PCC in both the occupancy tree and the predictive tree by predicting, in the spherical coordinate space, the location of a current point based on an already coded point by using the discrete nature of angles.

Figure 4:
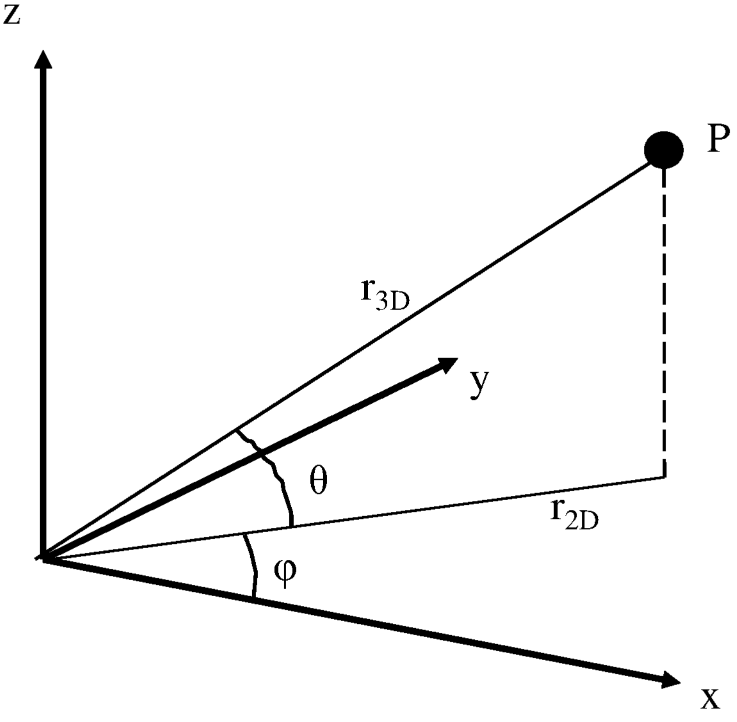
FIG. 4 shows schematically a representation of a point of a point cloud in a 3D space in accordance with at least one embodiment of the disclosure.

More precisely, the occupancy tree uses DCM intensively and entropy codes the direct locations of points within a node by using a context-adaptive entropy coder. Contexts are then obtained from the local conversion of the point locations into angular coordinates ($\phi$, $\theta$) and from the location of these angular coordinates relative to discrete angular coordinates ($\phi_i$, $\theta_j$) obtained from precedingly coded points. The predictive tree directly codes a first version of a point location in the angular coordinates ($r_{2D}$, $\phi$, $\theta$), where $r_{2D}$ is the projected radius on the horizontal xy plane as depicted on FIG. 4, using the quasi 1D nature ($r_{2D}$, $\phi_i$, $\theta_j$) of this angular coordinate space. Then, spherical coordinates ($r_{2D}$, $\phi$, $\theta$) are converted into 3D cartesian coordinates (x,y,z) and a xyz residual is coded to tackle the errors of coordinate conversion, the approximation of elevation and azimuthal angles and potential noise.

G-PCC does use the angular priors to better compress spinning Lidar-sensed sparse geometry data but does not adapt the coding structure to the order of sensing. By its very nature, the occupancy tree must be coded down to its last depth before outputting a point. This occupancy data is coded in the so-called breadth-first order: the occupancy data of the root node is first coded, indicating its occupied child nodes; then the occupancy data for each of the occupied child nodes is coded, indicating the occupied grand-child nodes; and so on iteratively over the tree depth until leaf nodes can be determined and the corresponding points are provided/output to an application or to the attribute(s) coding scheme. Regarding the predictive tree, the encoder is free to choose the order of point in the tree, but to obtain good compression performance, to optimize the prediction accuracy, G-PCC proposes to code one tree per sensor. This has mainly the same drawback as using one coding slice per sensor, i.e. non-optimal compression performance because prediction between sensors is not allowed and does not provide encoder low latency. Worse, one should have one coding processing per sensor and the number of core coding units should equal the number of sensors; this is not practical.

In brief, in a framework of a spinning sensors head used for sensing sparse geometry data of a point cloud, prior arts do not solve the problem of combining encoding and decoding simplicity, low latency and compression performance.

Moreover, sensing sparse geometry data of point cloud by using spinning sensors head has some drawbacks and other types of sensor head may be used.

The mechanical parts generating the spin (rotation) of a spinning sensors head are prone to breakage and are costly. Also, by construction, the angle of view is necessarily $2\pi$. This does not allow to sense a particular region of interest with high frequency, for instance it may be more interesting to sense in front of a vehicle than behind. Practically in most cases, when a sensor is attached to a vehicle, most of the $2\pi$ angle of view is screened by the vehicle itself and the screened angle of view does not need to be sensed.

Figure 5:
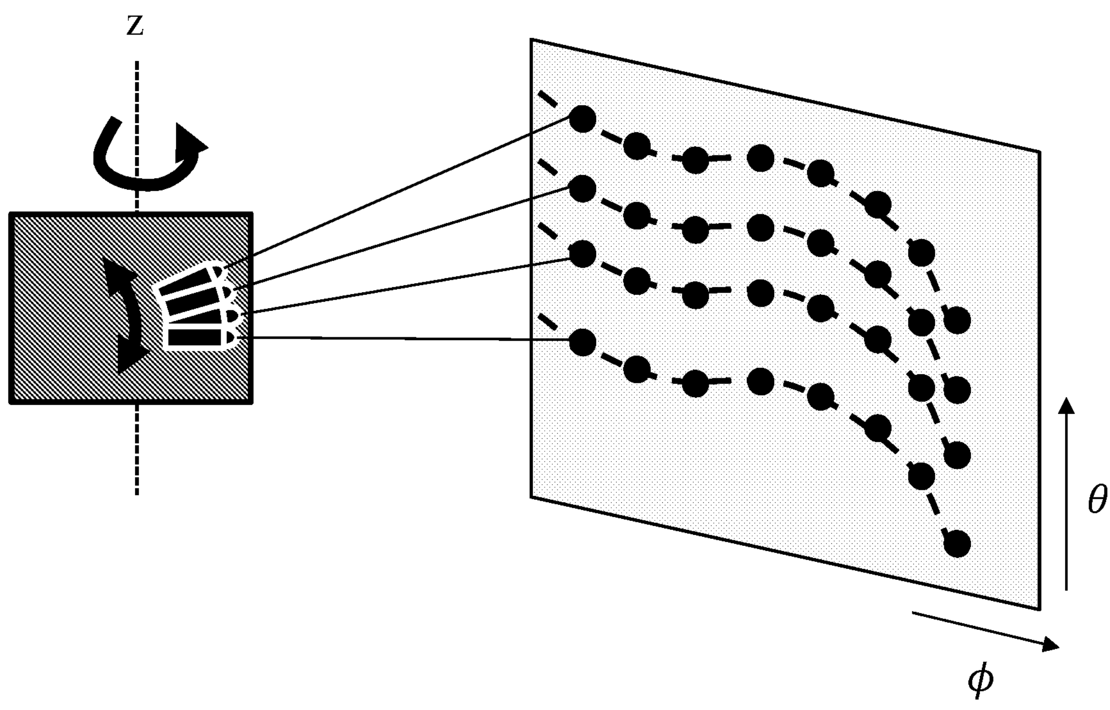
FIG. 5 shows schematically an example of a sensor head able to sense a real scene following a programmable sensing path in accordance with at least one embodiment of the disclosure
Figure 6:
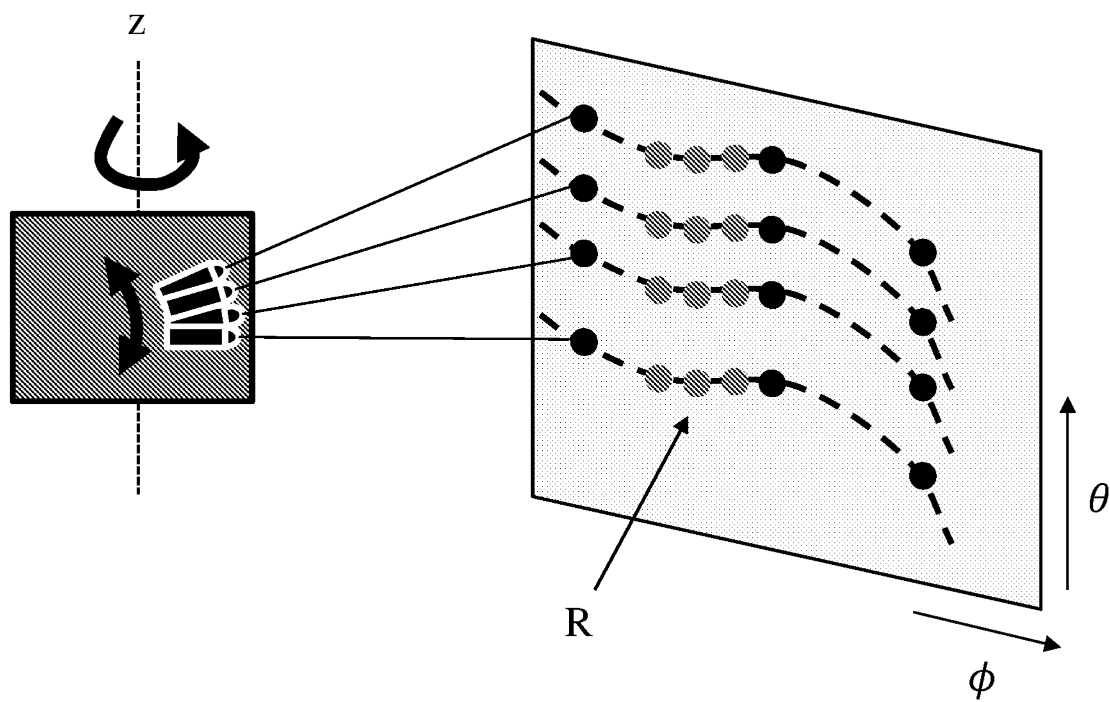
FIG. 6 shows schematically an example of a sensor head able to sense a real scene following a programmable sensing path according to different sensing frequencies in accordance with at least one embodiment of the disclosure.
Figure 7:
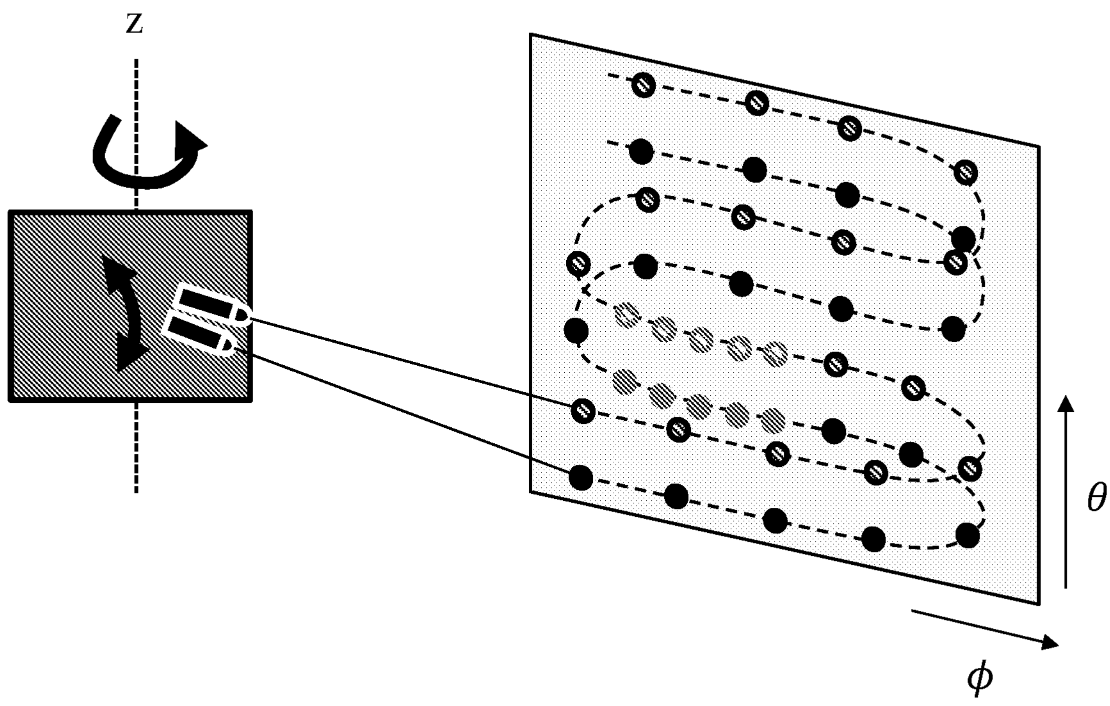
FIG. 7 shows schematically an example of a sensor head able to sense a real scene following a programmable zigzag sensing path according to different sensing frequencies in accordance with at least one embodiment of the disclosure.

New types of sensors have emerged recently, allowing for a more flexible selection of the region to be sensed. In most recent designs, a sensor can be more freely and electronically (thus avoiding fragile mechanical parts) moved to obtain a large variety of sensing paths in the 3D scene as depicted on FIG. 5. On FIG. 5, a set of four sensors is shown. Their relative sensing directions, i.e. azimuthal and elevation angles, are fixed relative to each other, however they overall sense a scene following a programmable sensing path depicted by dashed lines on the two-dimensional angular coordinate $(\phi,\theta)$ space. Points of the point cloud may then be sensed regularly along the sensing path. Some sensor heads may also adapt their sensing frequency by increasing their sensing frequency when a region of interest R has been detected as illustrated on FIG. 6. Such a region of interest R may be associated with a close object, a moving object, or any object (pedestrian, other vehicle, etc.) precedingly segmented, for instance in a previous frame, or dynamically segmented during the sensing. FIG. 7 shows schematically another example of a sensing path (typical zigzag sensing path) used by a sensor head comprising two sensors able to increase their sensing frequencies when a region of interest has been detected (grey shaded points and grey hashed points). Using a zigzag sensing path may be advantageously used to sense a limited (azimuthal) angular sector of a 3D scene. Because sensors may be attached to a vehicle, their viewports of interest are necessarily limited by the presence of the vehicle itself that obstructs the scene, unless the sensors are located at the top of the car. Consequently, sensors with a limited probing angular sector are of high interest and easier to integrate to a vehicle.

Figure 8:
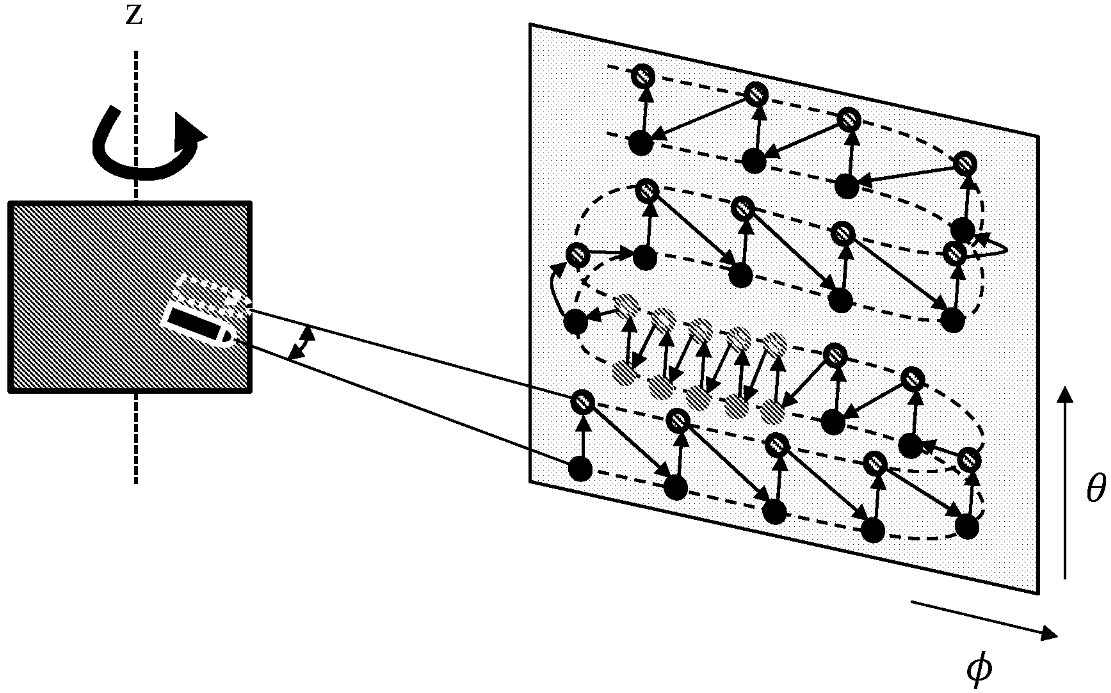
FIG. 8 shows schematically a single sensor head able to sense a real scene following a programmable zigzag sensing path according to different sensing frequencies.

As depicted on FIG. 8, a sensor head comprising a single sensor may also be used to sense multiple positions (two vertical positions on FIG. 8), for instance using reflections on mirrors oscillating with rotations (here vertical rotations). In that case, instead of using a set of sensors, a single sensor at different angular positions (i.e. with different elevation angle on FIG. 8) along a sensing path (here a zigzag sensing path) is used mimicking a sensing using a set of multiple sensors.

For the sake of simplicity, in the following descriptions and claims, the "sensor head" may refer to a set of physical sensors or a set of sensing elevation indexes mimicking a set of sensors as well. Also, one skilled in the art will understand that "a sensor" could also refer to a sensor in each sensing elevation index position.

Combining together requirements on encoder and decoder simplicity, on low latency and on compression performance of point cloud sensed by any type of sensors is still a problem that has not been satisfactory solved by existing point cloud codecs.

At least one embodiment of the disclosure has been devised with the foregoing in mind.

At least one of the aspects generally relates to point cloud encoding and decoding, one other aspect generally relates to transmitting a bitstream generated or encoded and one other aspects relates to receiving/accessing a decoded bitstream.

Moreover, the present aspects are not limited to MPEG standards such as MPEG-I part 5 or part 9 that relate to the Point Cloud Compression, and may be applied, for example, to other standards and recommendations, whether pre-existing or future-developed, and extensions of any such standards and recommendations (including MPEG-I part 5 and part 9). Unless indicated otherwise, or technically precluded, the aspects described in the disclosure may be used individually or in combination.

The disclosure relates to encoding/decoding point cloud geometry data represented by ordered coarse points of a coarse representation occupying some discrete positions of a set of discrete positions of a two-dimensional space.

For example, in the working group ISO/IEC JTC 1/SC 29/WG 7 on MPEG 3D Graphics Coding, a new codec named L3C2 (Low-Latency Low-Complexity Codec) is being considered to improve, relative to the G-PCC codec, the coding efficiency of Lidar-sensed point clouds. The codec L3C2 provides an example of a two-dimensional representation of the points of a point cloud namely a coarse representation. A description of the code can be found in the output document of the Working Group in N00167, ISO/IEC JTC 1/SC 29/WG 7, MPEG 3D Graphics Coding, "Technologies under Consideration in G-PCC", Aug. 31, 2021.

Basically, for each sensed point $P_n$ of the point cloud, a sensor index $\lambda_n$ associated with a sensor that sensed the point $P_n$ and an azimuthal angle $\phi_n$ representing a sense angle of said sensor are obtained by converting 3D cartesian coordinates $(x_n,y_n,z_n)$ representing the 3D location of the sensed point $P_n$. Points of the point cloud are then ordered based on the azimuthal angles $\phi_n$ and the sensor indices $\lambda_n$, for example, according to a lexicographic order based first on the azimuthal angle and then on the sensor index. The order index $o(P_n)$ of a point $P_n$ is then obtained by:

$$o(P_n) = \phi_n * K + \lambda_n$$

where K is the number of sensors.

Figure 9:
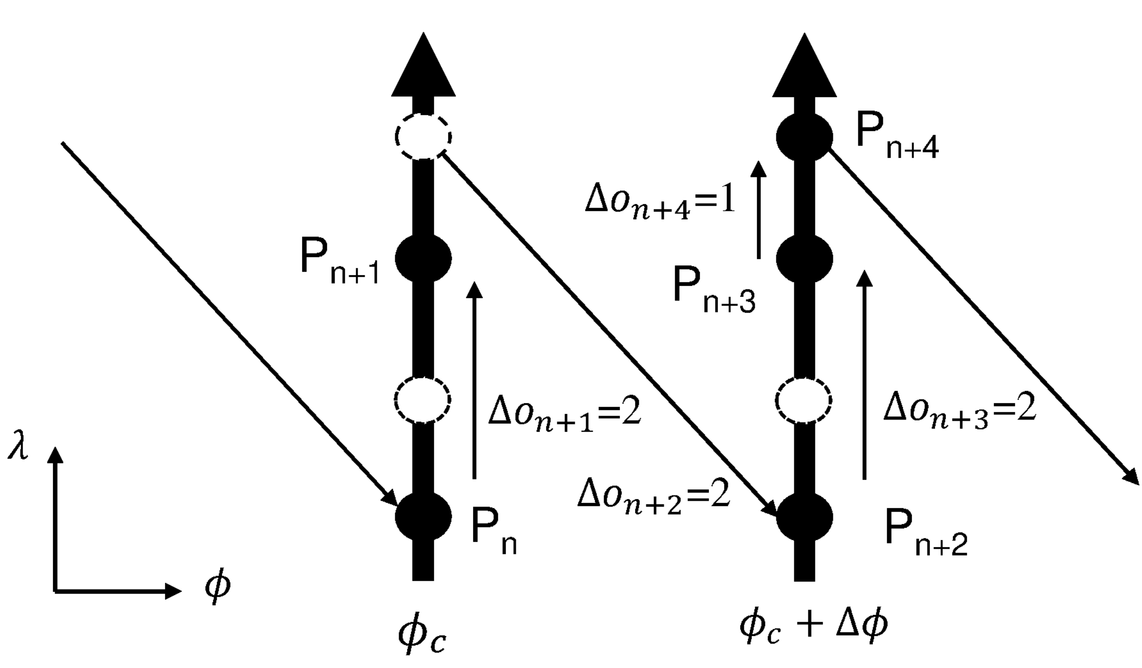
FIG. 9 shows schematically an example of ordered coarse points of a coarse representation in accordance with at least one embodiment.

FIG. 9 shows schematically ordered coarse points of a coarse representation. Five points of the point cloud have been sensed. Each of these five points are coarsely represented by a coarse point (black point) in the coarse representation: two coarse points $P_n$ and $P_{n+1}$ represent two points of the point cloud sensed at time $t_1$ with an angular angle $\phi_c$ (among the $\phi_i$'s) and three coarse points represent three points of the point cloud sensed at time $t_2$ with an angular angle $\phi_c+\Delta\phi$. A coarse point that represents a sensed point of the point cloud is namely an occupied coarse point and coarse point that do not represent a sensed point of the point cloud is namely an unoccupied coarse point. Because the points of the point cloud are represented by occupied coarse points in the coarse representation, the order indices associated with the points of the point cloud are also the order indices associated with the occupied coarse points.

The coarse representation of the point cloud geometry data may then be defined in a two-dimensional coordinate $(\phi, \lambda)$ space.

The coarse representation may also be defined for any types of sensors head including rotating (spinning) or non-rotating sensors heads. Its definition is based on a sensing path defined from sensor characteristics in a two-dimensional angular coordinate $(\phi, \theta)$ space comprising an azimuthal coordinate $\phi$ representative of an azimuthal angle representing a sensing angle of a sensor relative to a referential and an elevation coordinate $\theta$ representative of an elevation angle of a sensor relative to a horizontal referential plane. The sensing path is used to sense the points of the point cloud according to ordered coarse points representing potential locations of sensed points of the point cloud. Each coarse point is defined from one sample index s associated with a sensing time instant along the sensing path and one sensor index $\lambda$ associated with a sensor.

Figure 10:
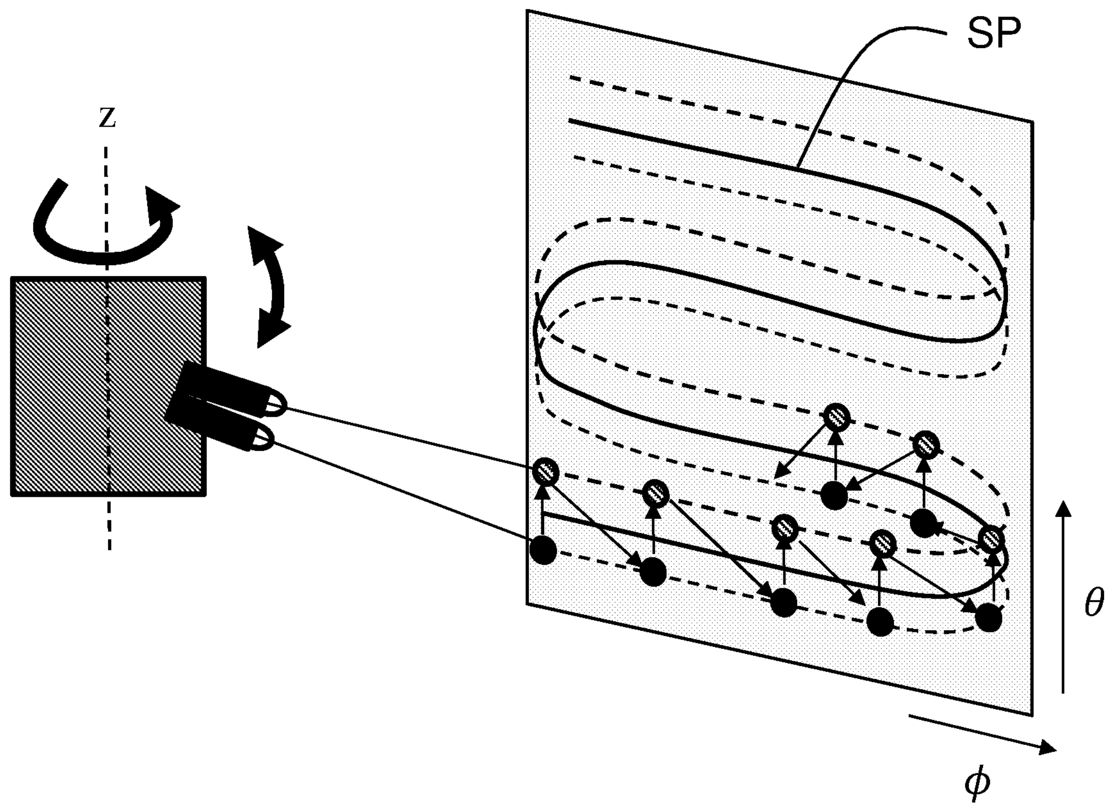
FIG. 10 shows schematically an example of ordered coarse points of a coarse representation sensed by a two-sensors head in accordance with at least one embodiment.
Figure 11:
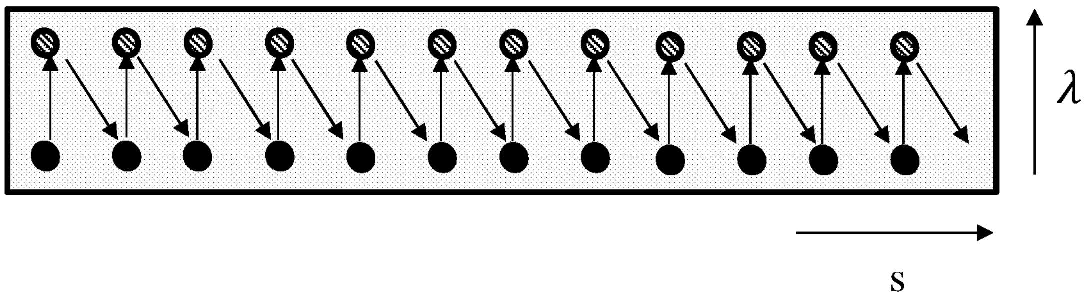
FIG. 11 shows schematically a representation of ordered coarse points in the two-dimensional coordinate $(s,\lambda)$ space.

On FIG. 10, a sensor head comprising two sensors is used. The sensing paths followed by the two sensors are represented in dash lines. For each sample index s (each sensing time instant), two coarse points are defined. The coarse points associated with the first sensor are represented by black shaded points on FIG. 10 and the coarse points associated with the second sensor are represented by a black hashed point. Each of these two coarse points belongs to a sensor sensing path (dash line) defined from the sensing path SP. FIG. 11 shows schematically a representation of ordered coarse points in the two-dimensional coordinate $(s,\lambda)$ space. Arrows on FIGS. 10 and 11 illustrate the links between two successive ordered coarse points.

An order index o(P) is associated with each coarse point according to the rank of said coarse point among the ordered coarse points:

$$o(P) = \lambda + s * K$$

where K is the number of sensors of a set of sensors or the number of different positions of a single sensor for a same sample index, $\lambda$ is the sensor index of the sensor that sensed the point P of the point cloud at the sensing time instant s.

Figure 12:
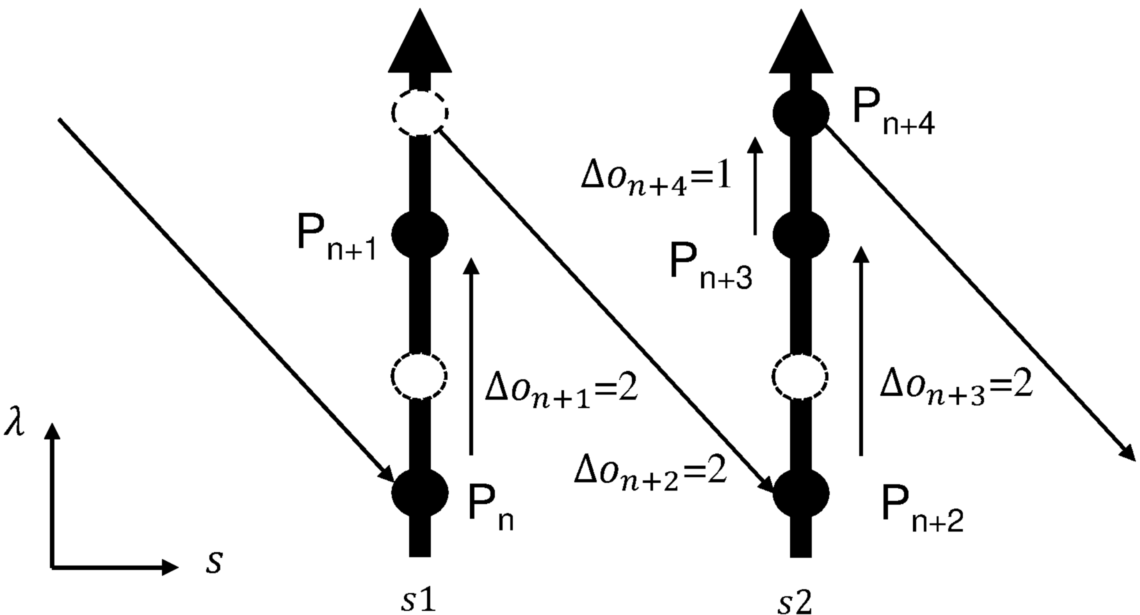
FIG. 12 shows schematically ordered coarse points of a coarse representation in accordance with at least one embodiment.

FIG. 12 illustrates ordered coarse points of a coarse representation, five occupied coarse points are represented (black circles): two coarse points $P_n$ and $P_{n+1}$ are occupied by two points of the point cloud sensed at a sensing time instant $t_1$ (corresponding to a sample index $s_1$) and three coarse points are occupied by three points of the point cloud sensed at a sensing time instant $t_2$ (corresponding to a sample index $s_2$).

The coarse representation of the point cloud geometry data may then be defined in a two-dimensional coordinate $(s,\lambda)$ space.

Independently of the two-dimensional space in which a coarse representation of point cloud geometry data is defined, encoding point cloud geometry data comprises encoding the occupancy data of occupied coarse points of the coarse representation by encoding order index differences $\Delta o$ representing, each, a difference between order indices of two consecutive occupied coarse points $P_1$ and P:

$$\Delta o = o(P) - o(P_{-1})$$

On FIG. 9, assuming the coordinates of a first occupied coarse point $P_n$ in the two-dimensional coordinate $(\phi, \lambda)$ space are known beforehand, a first order index difference $\Delta o_{n+1}$ is obtained as a difference between the order index $o(P_{n+1})$ associated with the occupied coarse point $P_{n+1}$ and the order index $o(P_n)$ associated with the occupied coarse point $P_n$. A second order index difference $\Delta o_{n+2}$ is obtained as a difference between the order index $o(P_{n+2})$ associated with another occupied coarse point $P_{n+2}$ and the order index $o(P_{n+1})$ associated with $P_{n+1}$, and so on.

On FIG. 12, assuming the coordinates of the first occupied coarse point $P_n$ in the two-dimensional coordinate $(s,\lambda)$ space are known beforehand, a first order index difference $\Delta o_{n+1}$ is obtained as a difference between the order index $o(P_{n+1})$ of the occupied coarse point $P_{n+1}$ and the order index $o(P_n)$ of the occupied coarse point $P_n$. In the example $\Delta o_{n+1=2}$ because a coarse point is not occupied (white circle). A second order index difference $\Delta o_{n+2}$ is obtained as a difference between the order index $o(P_{n+2})$ of another occupied coarse point $P_{n+2}$ and the order index $o(P_{n+1})$ of the occupied coarse point $P_{n+1}$, and so on.

The order index $o(P_1)$ of the first coarse point occupied by the first sensed point $P_1$ of the point cloud may be directly encoded into the bitstream B. This is equivalent to arbitrary setting the order index of a virtual zero-th point to zero, i.e. $o(P_0)=0$, and coding $\Delta o_1=o(P_1)-o(P_0)=o(P_1)$.

Given the order index $o(P_1)$ of the first coarse point occupied by the first sensed point $P_1$ of the point cloud, and order differences $\Delta o$, one can recursively reconstruct the order index o(P) of any occupied coarse point occupied by a sensed point P of the point cloud by:

$$o(P) = o(P_{-1}) + \Delta o$$

In the following, the disclosure is described by considering a coarse representation defined in the two-dimensional coordinate $(s,\lambda)$ space. But the same may also described for a coarse representation defined in the two-dimensional coordinate $(\phi,\lambda)$ space because a spinning sensor-head such a Lidar-head is a particular coarse representation defined in the two-dimensional coordinate $(s,\lambda)$ space in which at each sensing time instant, sensors of the sensors head probe an object and the sensed points correspond to occupied coarse point of the representation.

In brief, the method of encoding comprises obtaining at least one binary data representative of an order index difference $\Delta o$ representative of a difference between order indices of two consecutive coarse points and encoding each of said at least one binary data $f_j$ as follows. The one binary data $f_j$ may signal if the order index difference is equal some specific value $V_j$ such that the binary data $f_j$ signals the occupancy of a current coarse point $P_j$ at order $$o(P_j) = o(P_{-1}) + V_j$$

wherein $P_{-1}$ is the occupied coarse point within the two consecutive occupied coarse points.

First, a sensing number is obtained from a current coarse point $P_j$, The sensing number is representative of an average number of consecutive sensing needed by a sensor associated with the current coarse point $P_j$ to sense another coarse point. Next, the binary data $f_j$ is entropy encoded/decoded based on the sensing number.

Entropy encoding/decoding binary data representative of an order index difference may be based on geometric information depending on the geometry of the coarse representation such as the sensor indices or the index value of a current coarse point between two occupied coarse points. Such geometric information is not based on sensing characteristics of the sensors. As such, it may miss some important relevant information to predict the occupancy of coarse points of the coarse representation.

The sensing number, used for the entropy encoding/decoding, is representative of an average number of consecutive sensing needed by the sensor associated with a current coarse point to sense another coarse point. The sensing number provides thus information on the sensing characteristics as explained later in details.

Entropy encoding/decoding a binary data may comprises selecting a context based on the sensing number. Selecting contexts based on the sensing number provide better prediction and thus better entropy encoding/decoding of the binary data to be coded.

Figure 13:
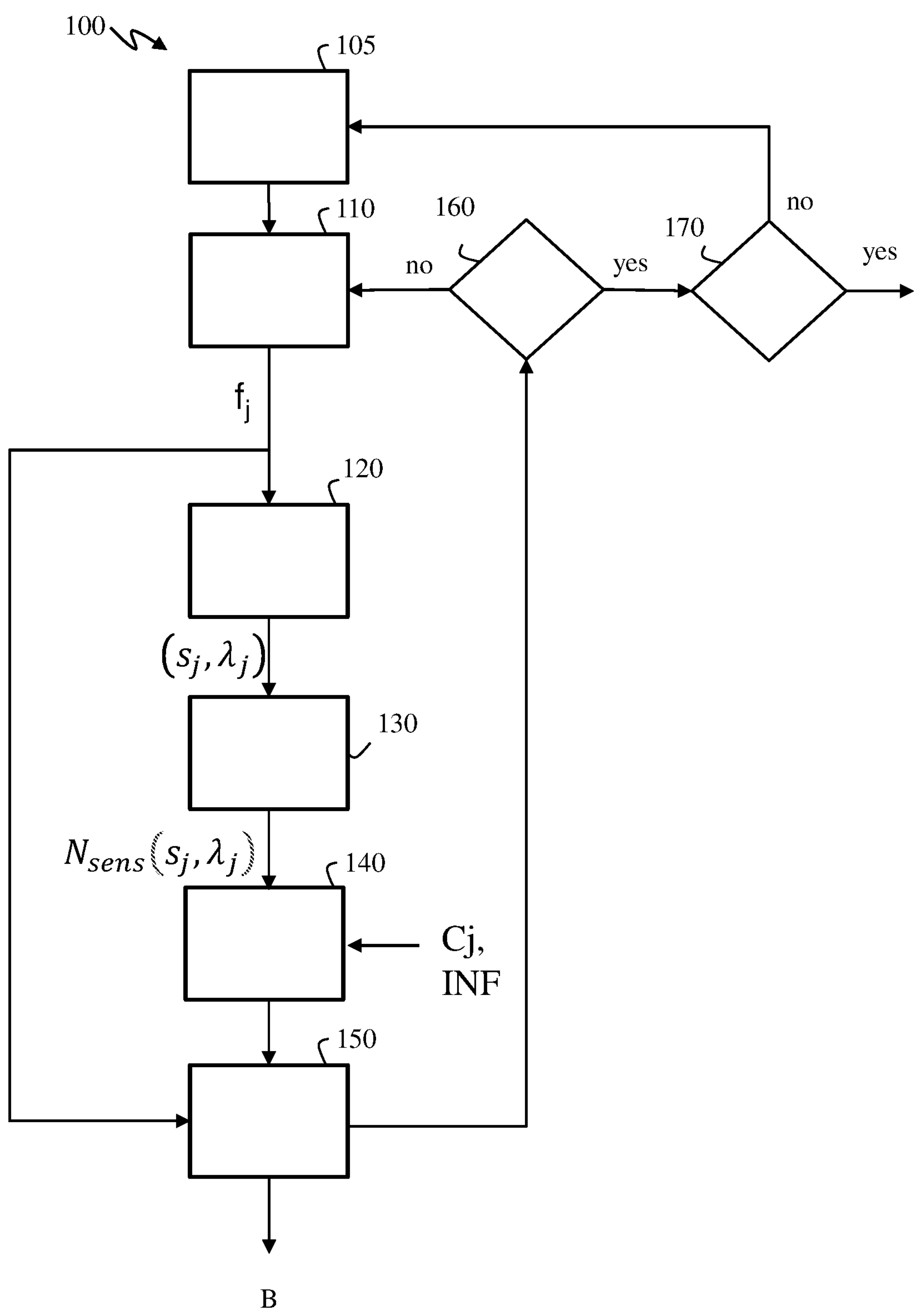
FIG. 13 shows a schematic block diagram of steps of a method 100 of encoding point cloud geometry data into a bitstream of encoded point cloud data in accordance with at least one embodiment.

FIG. 13 shows a schematic block diagram of steps of a method 100 of encoding point cloud geometry data into a bitstream of encoded point cloud data in accordance with at least one embodiment.

In step 105, at least one binary data $f_j$ representative of an order index difference $\Delta o$ is obtained. The order index difference $\Delta o$ is representative of a difference between order indices of two consecutive occupied coarse points in a coarse representation.

In one embodiment of step 105, said at least one binary data $f_j$ is obtained by unary coding the order index difference $\Delta o$.

For example, a unary representation of an order index difference $\Delta o$ equals to 8, may comprise nine binary data $f_0$ to $f_7$ all not equal to a value PV (typically PV=1) except the last one $f_8$ which equals to PV.

In step 110, one of said at least one binary data $f_j$ is considered.

In step 120, coordinates of a current coarse point $P_j$ within the two-dimensional space are obtained. The current coarse point $P_j$ has a first coordinate $\phi_j$ and a second coordinate $\lambda_j$ in the two-dimensional coordinate $(\phi,\lambda)$ space and a first coordinate $s_j$ and a second coordinate $\lambda_j$ in the two-dimensional coordinate $(s,\lambda)$ space.

Figures 14, 15:
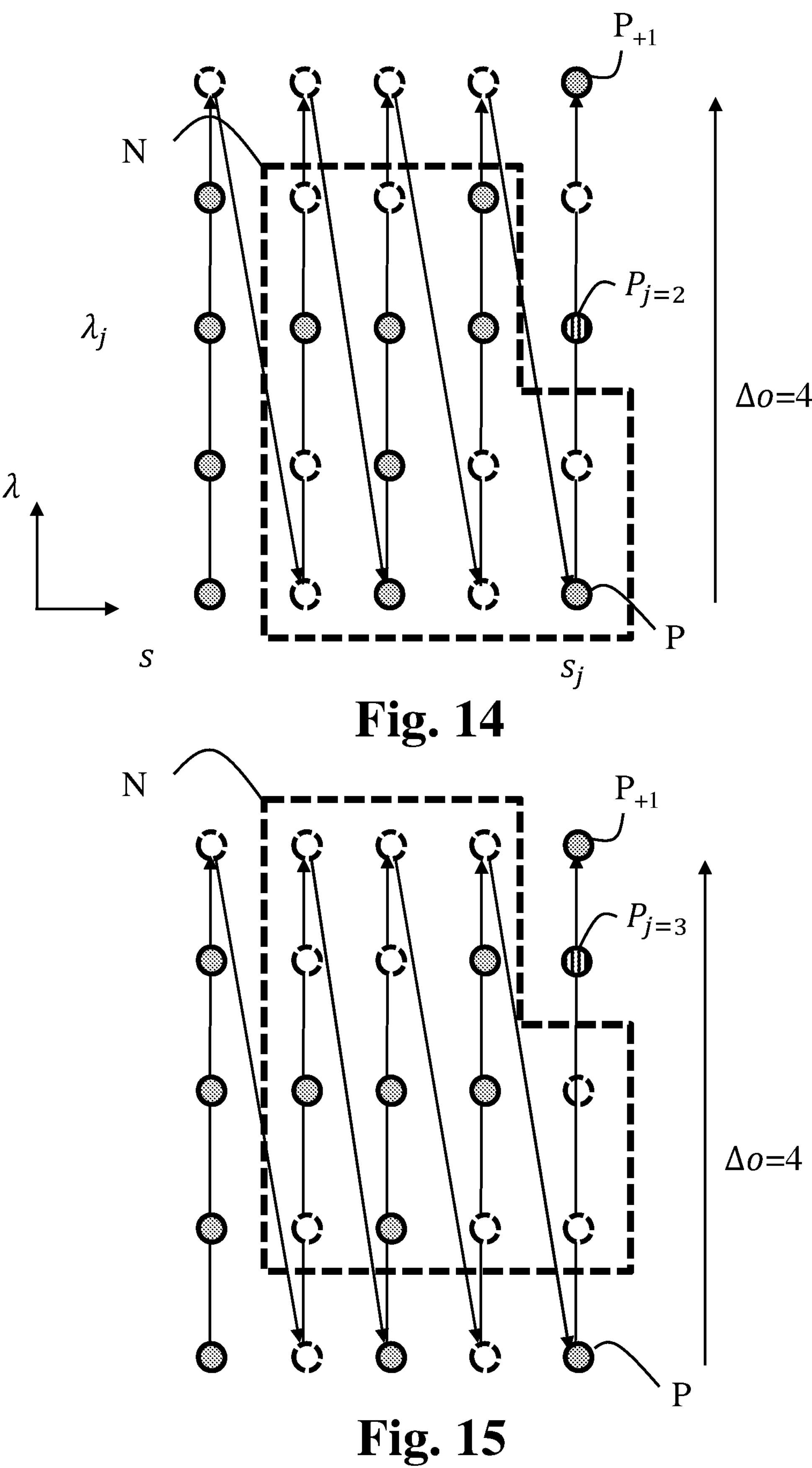
FIG. 14 shows schematically an example of a coarse representation with occupied and unoccupied coarse points in accordance with one embodiment.
FIG. 15 shows schematically an example of a coarse representation with occupied and unoccupied coarse points in accordance with one embodiment.

On FIG. 14, unoccupied coarse points are delimited by dotted lines and grey points represent occupied coarse points. The order index difference $\Delta o$ equals 4 on the shown example and is unary encoded by 3 binary data $f_0, \ldots, f_2$ not equals to the value PV and one binary data $f_3$ equals to the value PV. A current coarse point $P_j$ (hatched point) is located between an occupied coarse point P and a next occupied coarse point $P_{+1}$. The index j indicates that the current coarse point $P_j$ is the j-th unoccupied coarse point after the occupied coarse point P. On FIG. 14, the current coarse point $P_j$ is the second (j=2) coarse point from the occupied point P and on FIG. 15, the current coarse point $P_j$ is the third (j=3) coarse point from the occupied point P. A causal neighborhood N is defined around the current coarse point $P_j$. The causal neighborhood N may vary depending on the index j when encoding all the binary data $f_j$ representative of an order index difference. A different neighborhood occupancy configuration is used to encode each of said binary data $f_j$ as depicted on FIGS. 14 and 15. The current coarse point $P_j$ is the next occupied coarse point $P_{+1}$ when j=4 in this illustrative and no limitative example. $\lambda_j$ In step 130, a sensing number $N_{sens}(s_j,\lambda_j)$ is obtained from the current coarse point $P_j$. The sensing number $N_{sens}(s_j,\lambda_j)$ is representative of an average number of consecutive sensing needed by the sensor, associated with the current coarse point $P_j$ to sense another coarse point.

In other words, when the coarse representation uses the two-dimensional $(s,\lambda)$ coordinate space, the sensing number $N_{sens}(s_j,\lambda_j)$ is representative of a number of samples s to $s+N_{sens}(s_j,\lambda_j)$, in the coarse representation, needed to cover a distance between two coarse points separated by a distance roughly equals to a characteristic distance $L_{PC}$ of the point cloud.

Let $s_{last}$ be a sample index associated with a sensing time instant at which a point of the point cloud, represented by a last occupied point Plast in the coarse representation, has been sensed by the sensor associated with the sensor index $\lambda_j$ (sensor $\lambda_j$ in short) associated with the current coarse point $P_j$. In case $N_{sens}(s_j,\lambda_j)\leq 1$, a next coarse point sensed by the same sensor $\lambda_j$ is expected at next sample index $s_{last}+1$. Otherwise, in case $N_{sens}(s_j,\lambda_j)>1$, a next coarse point sensed by the sensor $\lambda_j$ is expected around sample index $s_{last}+N_{sens}(s_j,\lambda_j)$.

Therefore, the closer the sample index $s_j$ of the current coarse point $P_j$ is from $s_{last}+N_{sens}(s_j,\lambda_j)$, the more likely this current coarse point $P_j$ is occupied.

The sensing number $N_{sens}(s_j,\lambda_j)$ indicates how many "virtual sensing" are needed to see a next coarse point for the sensor $\lambda_j$. For example, if one has $N_{sens}(s_j,\lambda_j)=5$ then one expects to statistically have about one occupied coarse point among every 5 coarse points for the sensor $\lambda_j$.

The characteristic distance $L_{PC}$ is defined as follows. When coding with raw point cloud data sensed by a sensor, it is expected that all coarse points of the coarse representation have been sensed. When the sensor has probed an object (typically when a reflection of a laser beam on an object has been measured), the coarse point is occupied, otherwise it is unoccupied. In this case, occupancy data of coarse points is entirely related to the measurement of the sensor. However, not all coded point clouds are raw data. For example, a point cloud may be processed to obtain a spatial sampling precise to some minimal distance $L_{PC}$ between points in the three-dimensional cartesian coordinate space. This happens when floating point raw spatial data of the point cloud are converted into integer spatial data. The precision of the integers, more precisely the integers representing the 3D coordinates of point of the point cloud, provides some spatial sampling of the point cloud. In this case, a variation of 1 of a 3D coordinate of a point may correspond to a spatial variation of the minimal distance $L_{PC}$ in the raw data.

Beyond an easier implementation of integer representations, such spatial sampling may also be advantageous to reduce the size of the point cloud by decimating too dense regions. These dense regions are typically those very close to a vehicle (carrying the sensor head) because the density of points tends to decrease proportionally to the inverse of the distance $r_{object}$ between the sensor head and a sensed object if one assumes constant angular sensing. Most of use cases, like autonomous driving, do not require a sub-millimetric spatial precision or even a sub-centimetric precision. Practically, most of sensing systems cannot provide such precision. For example, assuming a useful precision of about $L_{PC}$=2 cm in the 3D cartesian space and a sensing device able to sense every azimuthal angle with an angular step $\Delta\phi=0.2°=0.2*2\pi/360$ radians (about 2000 sensing per turn for a rotating Lidar), then objects at a distance (radius) $r_{dense}$ lower than $$r_{dense} = L_{PC}/\Delta\phi = 2/(0.2*2\pi/360) \approx 573 \text{ cm} \approx 5 \text{ m}$$

are over sampled by the sensing system. In this example, the angular step $\Delta\phi$ is typically an azimuthal shift between two sensing of a same sensor of the sensor head used to sense an object. This azimuthal shift may be constant, typically for rotating (Lidar) sensor head, or may vary over the overall path of sensing as depicted on FIG. 7. In any case, the azimuthal shift $\Delta o$ may be obtained from information related to the characteristics of the probing scheme of the sensing device.

Figure 16:
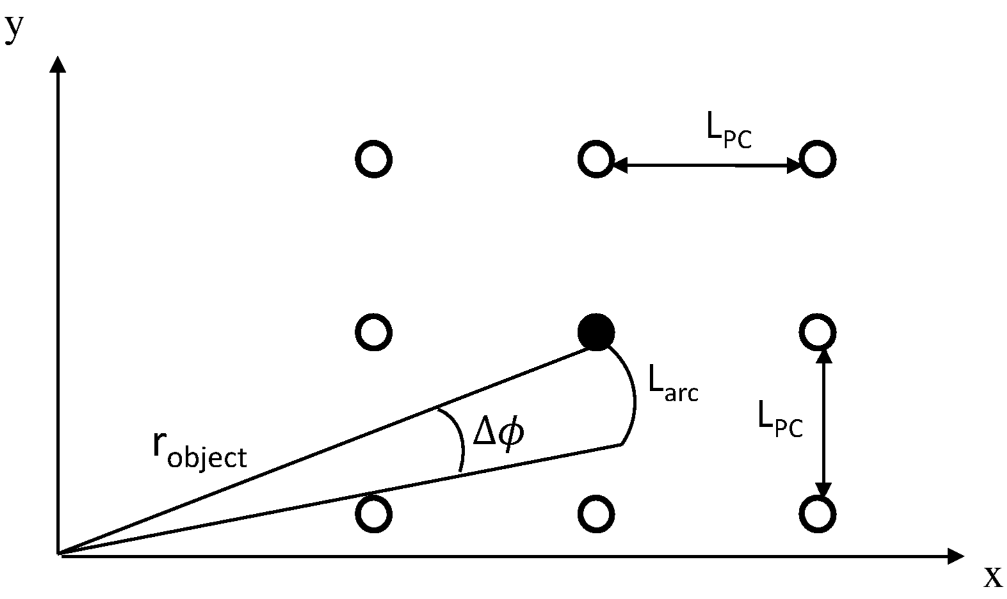
FIG. 16 shows schematically a representation of the characteristic point cloud distance and the distance between two consecutive sensing by a same sensor in accordance with one embodiment.

Spatial sub-sampling (decimation) may be obtained by quantizing the three (floating point or integer) cartesian coordinates (x,y,z) to the wanted precision ($L_{PC}$) into integer sampled coordinates (x',y',z')

$$(x', y', z') = L_{PC} * \text{round}((x, y, z)/L_{PC})$$

and then three-dimensional duplicated points, i.e. two points having same three-dimensional sampled coordinates (x',y',z'), may be merged to keep at most only one point per sampled coordinate. By doing so, points of the point cloud are located on a 3D grid of step $L_{PC}$ as illustrated on FIG. 16.

Spatial sub-sampling may also occur due to the precision of storage of the three-dimensional coordinates of the points once sensed by the sensor. In this case, the characteristic distance $L_{PC}$ relates to the maximum precision of the format of point coordinates.

In one variant, the characteristic distance $L_{PC}$ between points may not necessarily apply to a two-dimensional grid. Instead, spatial three-dimensional sampling over surfaces (using intermediate meshing for example) may have been applied, leading to a typical distance $L_{PC}$ between points that are not located on a grid. Therefore, in this case, for an occupied point (in full black, depicted in the xy plane), points (white) on FIG. 16 should be interpreted as other potential points being typically not closer than the characteristic distance $L_{PC}$.

In one variant, the lower bound on the characteristic distance $L_{PC}$ between points should not be taken as systematically fulfilled but, instead, as a strong indication of a minimal distance, i.e. two points are more likely than not to be separated by at least the characteristic distance $L_{PC}$ in the three-dimensional cartesian coordinate space or in the two-dimensional cartesian plane.

For an object located at a radius (distance) $r_{object}$ from a sensor, the arc length $L_{arc}$ in the two-dimensional cartesian coordinate plane between two consecutive sensing by said sensor is $$L_{arc} = r_{object} * \Delta\phi$$

Consequently, if $L_{arc}<L_{PC}$ then it is expected that some of the coarse points of the coarse representation cannot correspond to any point of the point cloud. On the other hand, if $L_{arc}>L_{PC}$ then it is likely that most coarse points may correspond to a point of the point cloud.

In step 150, the binary data $f_j$ is then entropy encoded based on the sensing number $N_{sens}(s_j,\lambda_j)$.

The encoding method processes to the encoding of a next binary data $f_j$ of the at least one binary data $f_j$ representative of the order index difference $\Delta o$ (step 160). When all binary data $f_j$ of the at least one binary data $f_j$ are encoded, at least one binary data $f_j$ representative of another order index difference representative of a difference between order indices of two other consecutive occupied coarse points is decoded is encoded (step 170), and the method ends when all occupied coarse points have been considered.

Because the sensing number $N_{sens}(\lambda_j,s_j)$ does not carry much information in case it is small, say lower than or equal to one, in one embodiment of step 150, the binary data $f_j$ is entropy encoded based on the sensing number $N_{sens}(s_j,\lambda_j)$ only if the sensing number $N_{sens}(s_j,\lambda_j)$ is greater than an activation threshold $th_{activation}$. Otherwise, the binary data $f_j$ is entropy encoded based on at least on a coordinate difference $C_j$ and not on the sensing number $N_{sens}(s_j,\lambda_j)$, or, in one variant, at least on a neighborhood coordinate difference $C_{j,w}$ (and optionally on the series of binary data $f_{j,n}$ indicating the occupancy status of each coarse point belonging to the causal neighborhood N) but not on the sensing number $N_{sens}(s_j,\lambda_j)$.

Entropy encoding the binary data $f_j$ based on the coordinate difference Cj (or the neighborhood coordinate difference $C_{j,w}$) is advantageous because the coordinate difference $C_j$ (or $C_{j,w}$) is very efficient to anticipate the value of the binary value $f_j$ that signals the occupancy data of the j-th coarse point. It is particularly efficient in case $N_{sens}(s_j,\lambda_j)$ is at most equal to one.

In one embodiment of step 150, the coordinate difference $C_j$ may be obtained between the sample index $s_j$ and a sample index $s_{prec}$ associated with a sensing time instant at which a preceding encoded or decoded point $P_{prec}$ has been sensed with a same sensor index as the sensor index $\lambda_j$. The current coarse point is never considered in the set of already coded points from which the preceding already coded point $P_{prec}$ is determined:

$$C_j = s_j - s_{prec}$$

In one embodiment, the preceding occupied coarse point $P_{prec}$ is the penultimate occupied coarse point $P_{penult}$.

Figure 17:
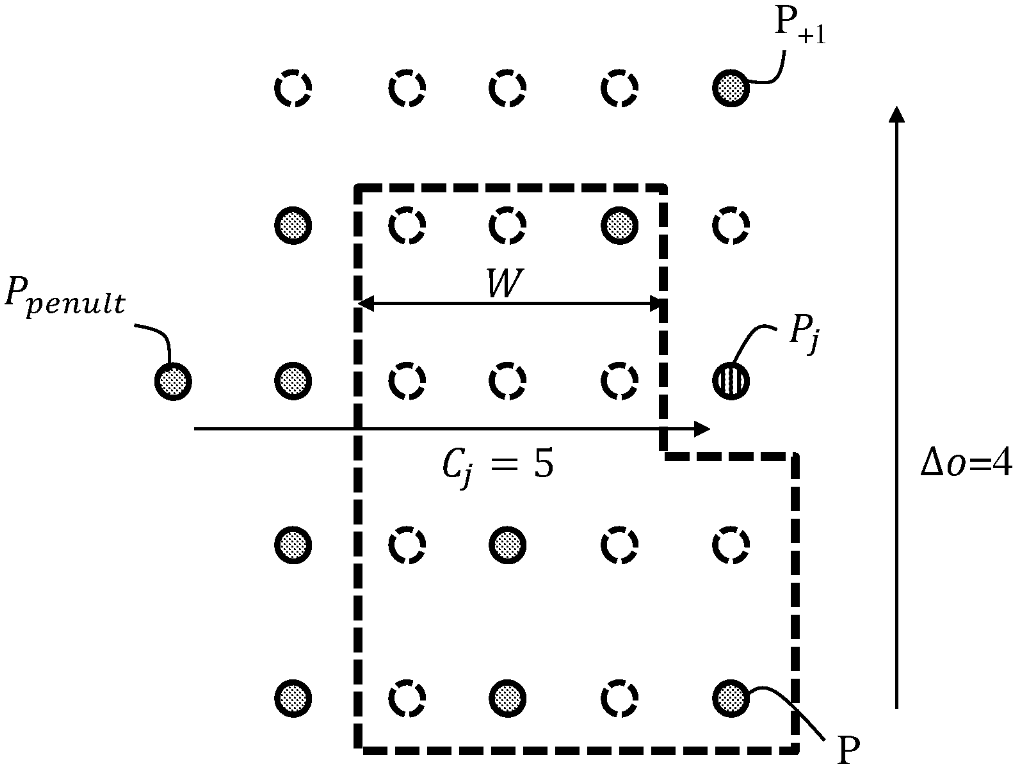
FIG. 17 shows schematically an example of a coordinate difference $C_j$ computed on an example of a neighborhood occupancy configuration.
Figures 18, 19:
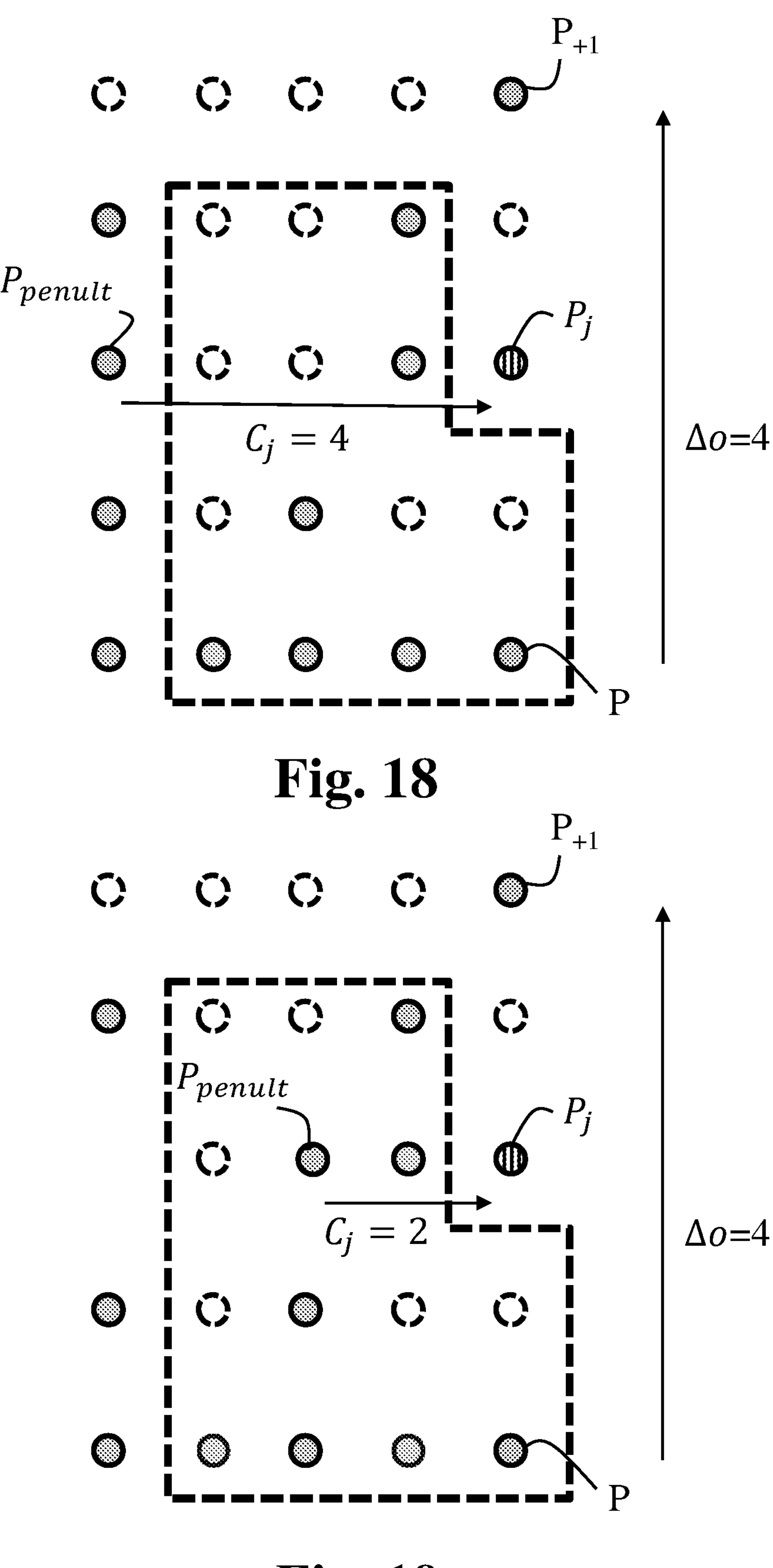
FIG. 18 shows schematically an example of a coordinate difference $C_j$ computed on an example of a neighborhood occupancy configuration.
FIG. 19 shows schematically an example of a coordinate difference $C_j$ computed on an example of a neighborhood occupancy configuration.

FIGS. 17 and 18 show two examples of two neighborhood occupancy configurations where the penultimate occupied coarse point $P_{penult}$ does not belong to the causal neighborhood (delimited by a dotted line). In this case, the coordinate difference $C_j$ is not redundant with the neighborhood occupancy configuration.

Figures 20, 21:
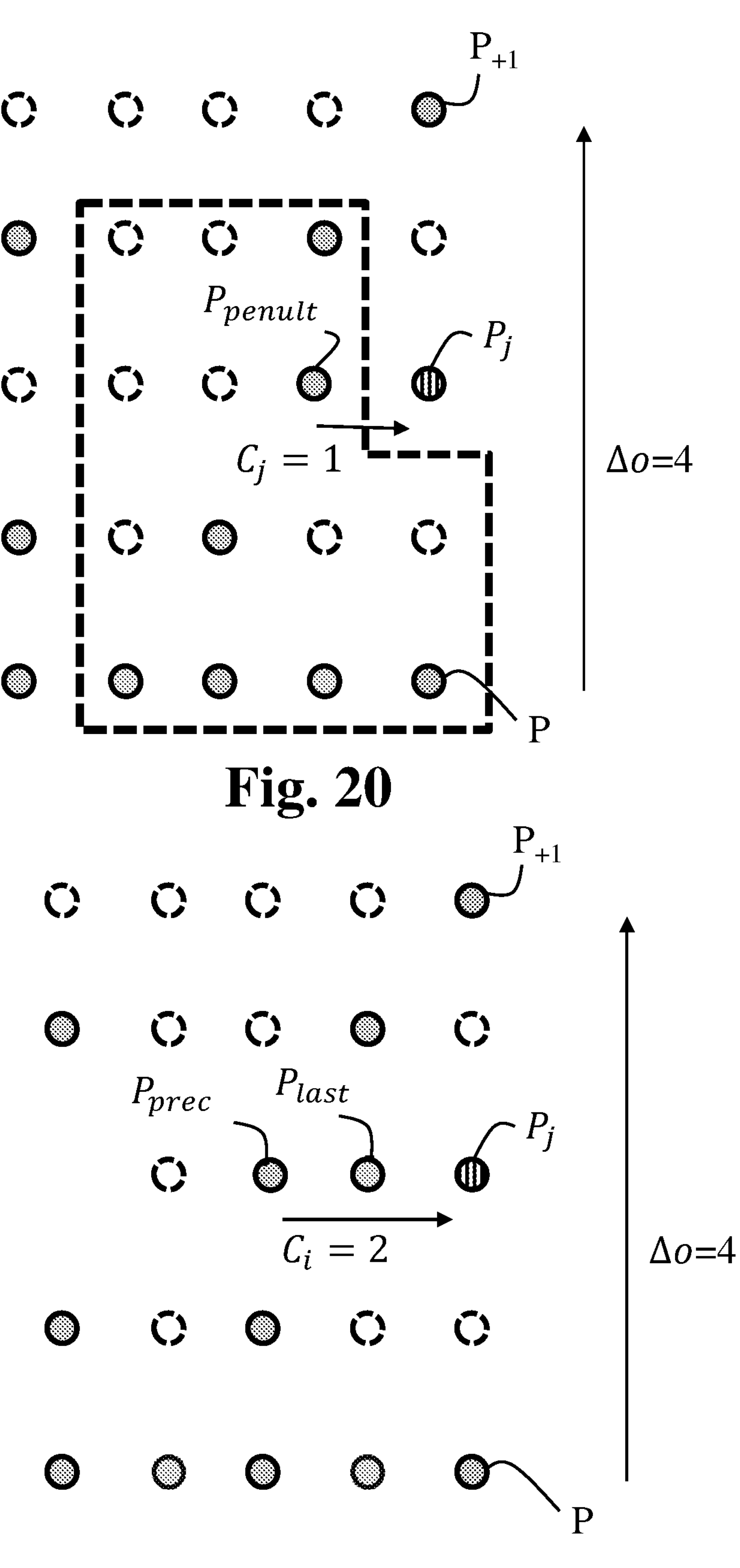
FIG. 20 shows schematically an example of a coordinate difference $C_j$ computed on an example of a neighborhood occupancy configuration.
FIG. 21 shows schematically an example of a difference between two sample indices associated with two different sensing time instants at which two coarse points have been sensed with a same sensor in accordance with one embodiment.

FIGS. 19 and 20 show two examples of two neighborhood occupancy configurations where the penultimate occupied coarse point $P_{penult}$ does belong to the causal neighborhood. In FIG. 19, the coordinate difference $C_j$ is completely contained in the neighborhood occupancy configuration. However, in FIG. 20 where preceding and penultimate occupied coarse points are equal, the neighborhood occupancy configuration cannot detect duplicate point. One notices that neighborhood occupancy configurations of FIGS. 18 and 20 are the same but the coordinate difference $C_j$ does differ.

If a neighborhood width W of the causal neighborhood N, defined for example from the first coordinate of the current occupied coarse point (W=3 on FIG. 17), is large enough to ensure that the penultimate occupied coarse point $P_{penult}$ belongs to the neighborhood, then the coordinate difference $C_j$ is already contained in the neighborhood occupancy configuration.

In some examples, a coordinate difference $C_j$ as large as 6, 7 or even 8 do provide solid prediction of the first binary data $f_j$.

Preferably, a neighborhood height of 5 including the current sensor "line" (coarse points corresponding to a same sensor with sensor index $\lambda_j$) plus two "lines" below (sensors with sensor index $\lambda_{j-1}$ and $\lambda_{j-1}$) plus two lines above (sensors with sensor index $\lambda_{j+1}$ and $\lambda_{j+1}$) has observed to be an adequate size to anticipate the value of the first binary data $f_j$. Consequently, ensuring that the penultimate occupied coarse point belongs to the causal neighborhood would require at least 6*5+2=32 neighbors, thus leading to $2^{32}$=1 billion possible neighborhood occupancy configurations.

In one embodiment, a neighborhood coordinate difference $C_{j,w}$ is obtained based on a comparison of the coordinate difference $C_j$ with the neighborhood width W, and the first binary data $f_j$ is entropy encoded (step 150) based on a neighborhood coordinate difference $C_{j,w}$ given by:

$$C_{j,w} = \max(C_j, W).$$

The occupancy configuration of the causal neighborhood N may be represented by a series (indexed by n) of at least one second binary data $f_{j,n}$ indicating the occupancy status of each coarse point belonging to the causal neighborhood N. In one embodiment of step 150, the first binary data $f_j$ is entropy encoded based on the series of at least one second binary data $f_{j,n}$ and the neighborhood coordinate difference $C_{j,w}$.

Using $C_{j,w}$ instead of $C_j$ ensures that the case when preceding occupied coarse point $P_{prec}$ belongs to the causal neighborhood N is detected by $C_{j,w}$ being equal to W and, in this case, the redundancy between the coordinate difference $C_j$ and the causal neighborhood N is removed.

In one variant, the neighborhood coordinate difference $C_{j,w}$ is equal to a particular value if and only if the preceding occupied coarse point $P_{prec}$ belongs to the causal neighborhood N.

For example, the neighborhood coordinate difference $C_{j,w}$ is defined by $$C_{j,w} = \max(C_j, W) - W.$$

and the preceding occupied coarse point $P_{prec}$ belongs to the causal neighborhood N if and only if $C_{j,w}$=0. The neighborhood coordinate difference $C_{j,w}$ is thus contained in a given neighborhood occupancy configuration. Otherwise, when the neighborhood coordinate difference $C_{j,w}$>0, the coordinate difference $C_j$ is simply retrieved by $C_j = C_{j,w}$+W.

In one embodiment of step 150, the binary data ($f_j$) is entropy encoded based on a value $\Delta_j$ depending on the sample index $s_j$ of the current coarse point $P_j$, the sample index $s_{last}$ and the sensing number $N_{sens}(s_i,\lambda_i)$ given by:

$$\Delta_j = s_j - s_{last} - N_{sens}(s_j, \lambda_j)$$

In one variant, the binary data $f_j$ is entropy encoded based on a bounded value $\Delta_j'$ of the value $\Delta_j$ given by:

$$\Delta_j' = \max(th_{low}, \min(th_{high}, \Delta_j))$$

where $th_{low}$ and $th_{high}$ are two thresholds with $th_{high}$>$th_{low}$

In one embodiment of step 130, illustrated on FIG. 21, the number $N_{sens}(s_j,\lambda_j)$ is obtained based on a radius $r_{object}$ associated with the last occupied coarse point $P_{last}$ sensed by the sensor with the sensor index $\lambda_j$.

Figure 22:
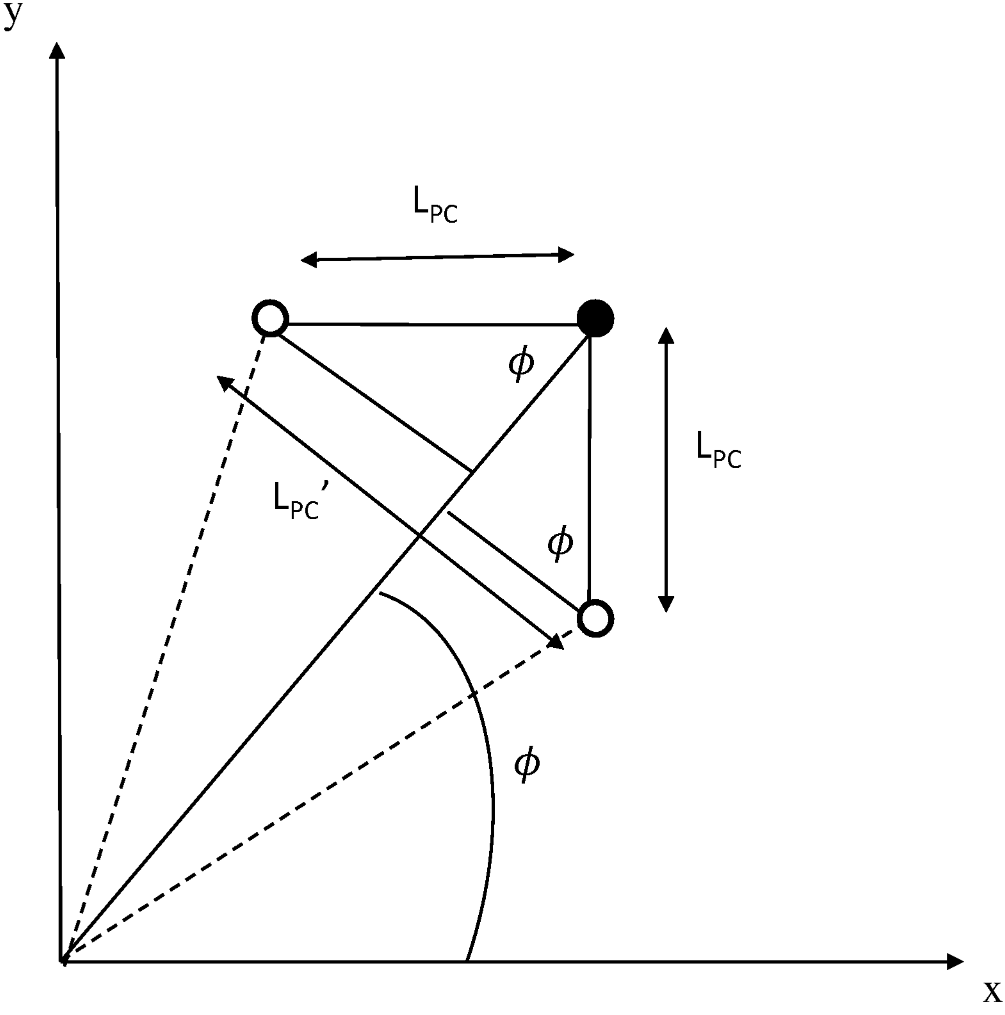
FIG. 22 shows schematically an illustration of a correction of the sensing number in accordance with one embodiment.

In one embodiment of step 130, illustrated on FIG. 22, the sensing number $N_{sens}(s_j,\lambda_j)$ may be corrected based on an azimuthal angle d $$\begin{aligned} N_{sens}(s_j, \lambda_j) &= \text{floor}\left(L'_{PC}/L_{arc}\right) \\ &= \text{floor}\left(L_{PC} * (|\cos(\phi)| + |\sin(\phi)|)/(r_{object} * \Delta\phi)\right) \end{aligned}$$

with $L_{PC}'=L_x+L_y=L_{PC}*(|\cos(\phi)|+|\sin(\phi)|)$. The azimuthal angle $\phi$ is representative of the sensing of the current coarse point $P_j$ and may be obtained from the sensing index $s_j$ or may be obtained from the azimuthal angle $\phi_{last}$ of the last occupied coarse point $P_{last}$.

In one embodiment of step 130, in case $L_{arc}$<$L_{PC}$, the sensing number $N_{sens}(s_j,\lambda_j)$ is given by:

$$N_{sens}(s_j, \lambda_j) = \text{floor}\left(L_{PC}/L_{arc}\right) = \text{floor}\left(L_{PC}/(r_{object} * \Delta\phi)\right)$$

The sensing number $N_{sens}(s_j,\lambda_j)$ is local in the two-dimensional representation as it depends on the azimuthal shift $\Delta\phi$ and the radius $r_{object}$ that may both depend on the sensor index $\lambda_j$ and the sampling index $s_j$.

The characteristic distance $L_{PC}$ is a characteristic of the point cloud.

In one embodiment of step 130, the characteristic distance $L_{PC}$ may be encoded in the bitstream, typically in a SPS (Sequence Parameter Set) or a GPS (General Parameter Set).

In one embodiment of step 130, the characteristic distance $L_{PC}$ may depend on a three- or two-dimensional region of the space. In this case, the characteristic distance $L_{PC}$ may be encoded for each region.

In one embodiment of step 130, the sensing number $N_{sens}(s_j,\lambda_j)$ equals a number N such that the arc length $L_{arc}$ obtained between the current sensing at a current sample index s and a future sensing at a sample index s+N is about equal to the characteristic distance $L_{PC}$:

$$L_{arc} = r_{object} * |\phi_{s+N} - \phi_s| \approx L_{PC}$$

The number N may be obtained iteratively by testing N=1, N=2, etc.

Figure 23:
FIG. 23 shows a schematic block diagram of steps of a method 200 of decoding point cloud geometry data from a bitstream of encoded point cloud data in accordance with at least one embodiment.
Figure 23:
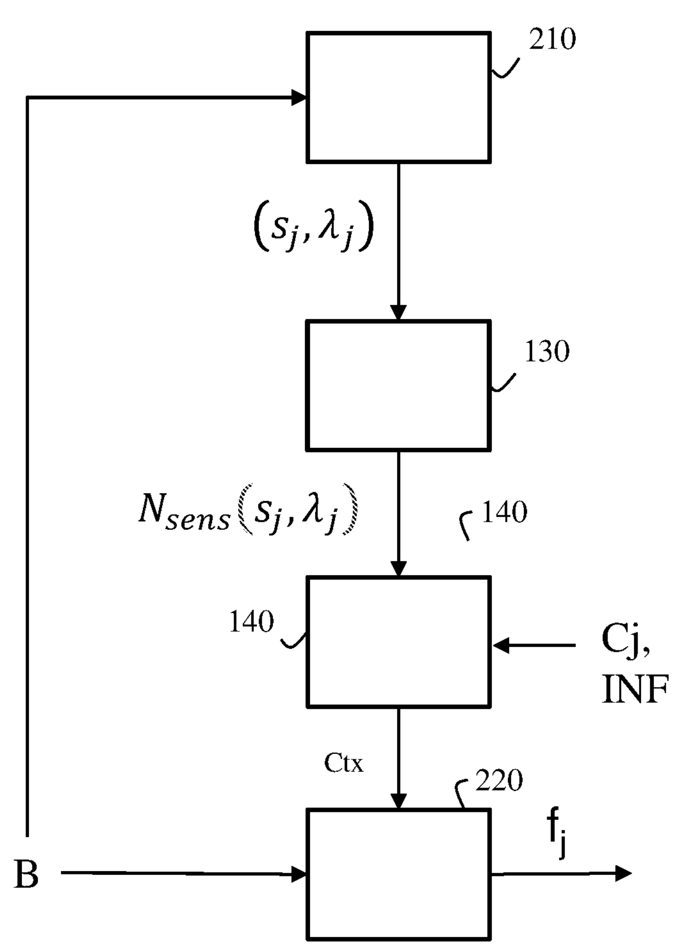

FIG. 23 shows a schematic block diagram of steps of a method 200 of decoding point cloud geometry data from a bitstream of encoded point cloud data in accordance with at least one embodiment.

The decoding method 200 is straightforwardly deduced from the encoding method 100.

In step 210, coordinates of a current coarse point $P_j$ within a two-dimensional space are obtained. The current coarse point $P_j$ has a first coordinate $\phi_j$ and a second coordinate $\lambda_j$ in the two-dimensional coordinate $(\phi,\lambda)$ space and a first coordinate $s_j$ and a second coordinate $\lambda_j$ in the two-dimensional coordinate $(s,\lambda)$ space.

A sensing number $N_{sens}(s_j,\lambda_j)$ is obtained in step 130 as above discussed.

In step 220, the binary data $f_j$ is entropy decoded from the bitstream B based on the sensing number $N_{sens}(s_j, \lambda_j)$.

Then, the decoding method processes to the decoding of a next binary data $f_j$ of said at least one binary data representative of the order index difference $\Delta o$. When all binary data $f_j$ representative of the order index difference $\Delta o$ are decoded, another order index difference representative of another difference between order indices of two consecutive occupied coarse points is decoded and the method ends when all occupied coarse points have been considered.

In one embodiment of step 220, the binary data $f_j$ is entropy decoded based on the sensing number $N_{sens}(s_j,\lambda_j)$ only if the sensing number $N_{sens}(s_j,\lambda_j)$ is greater than an activation threshold $th_{activation}$. Otherwise, the binary data $f_j$ is entropy decoded based on at least on a coordinate difference $C_j$ and not on the sensing number $N_{sens}(s_j,\lambda_j)$, or, in one variant, at least on a neighborhood coordinate difference $C_{j,w}$ (and optionally on a series of binary data $f_{j,n}$ indicating an occupancy status of each coarse point belonging to the causal neighborhood N) but not on the sensing number $N_{sens}(s_j,\lambda_j)$.

In one embodiment of step 150, the binary data $(f_j)$ is entropy decoded based on a value $\Delta_j$ or $$\Delta'_j.$$

In one embodiment of step 150, respectively 220, a binary data $f_j$ is encoded, respectively decoded, by a binary arithmetic coder, respectively decoder, using a probability pr of a binary data $f_j$ to be true ($f_j$=1) based on the sensing number $N_{sens}(s_j,\lambda_j)$ or optionally on the coordinate difference $C_j$ ($C_{w,j}$) and on the series of binary data $f_{j,n}$. In this case, the sensing number $N_{sens}(s_j,\lambda_j)$, or optionally on the coordinate difference $C_j$ ($C_{w,j}$) and on the series $f_{j,n}$ of binary data, may point to an element of a table T of probabilities such that $pr=T[N_{sens}(s_j,\lambda_j)]$ or $pr=T[C_j]$ or $pr=T[C_{w,j}]$ or $pr=T[C_{w,j}, f_{j,n}]$. The probability pr may be updated after the coding of the binary data $f_j$ depending on its value (false vs true or 0 vs 1).

Figure 24:
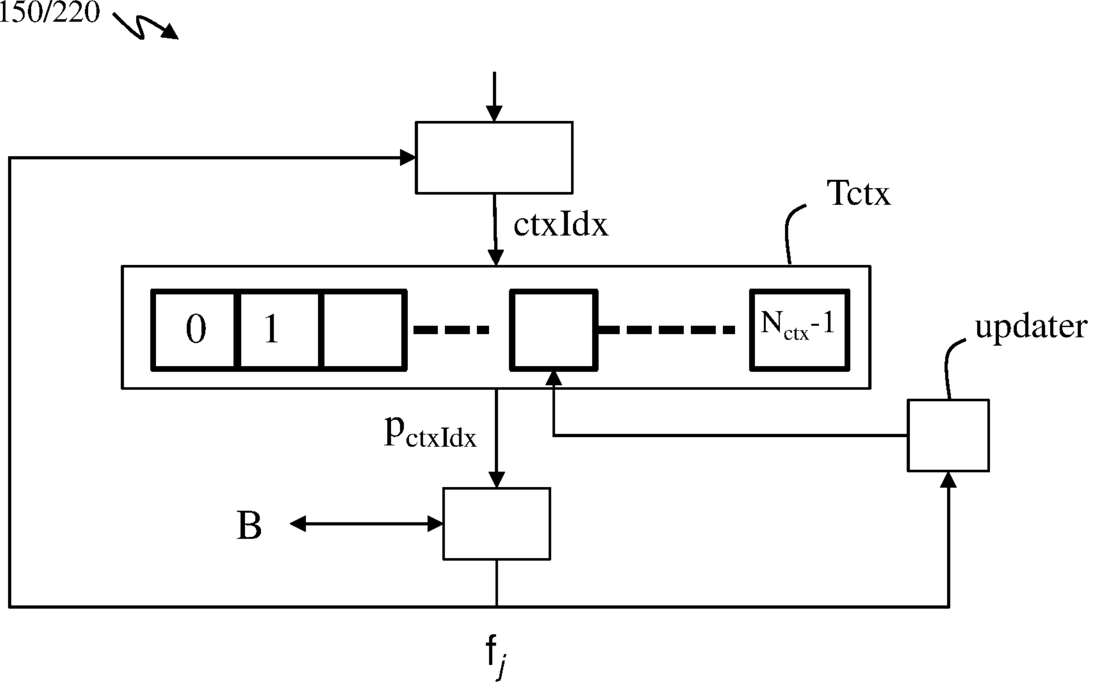
FIG. 24 shows a schematic block diagram of steps of a Context Adaptive Binary Arithmetic Coder in accordance with at least one embodiment.

In one embodiment step 150, respectively 220, depicted on FIG. 24, a binary data $f_j$ is context-based adaptive entropy encoded, respectively decoded. Said context-based adaptive entropy encoding, respectively decoding may comprise selecting a context Ctx from the sensing number $N_{sens}(s_j,\lambda_j)$ or optionally on the coordinate difference $C_j$ ($C_{w,j}$) and on the series of binary data $f_{j,n}$ The context Ctx may be selected from a table T of contexts based on at least the sensing number $N_{sens}(s_j,\lambda_j)$ or optionally the coordinate difference $C_j$ or $C_{j,w}$, and on the series of binary data $f_{j,n}$, such that $Ctx=T[N_{sens}(s_j,\lambda_j)]$ or $Ctx=T[C_j]$ or $Ctx=T[C_{w,j}]$ or $Ctx=T[C_{w,j}, f_{j,n}]$.

The first binary data $f_j$ is context-based entropy coded into the bitstream B based on the selected context Ctx. The first binary data $f_j$ is context-based entropy decoded based on the selected context Ctx.

In one variant, depicted on FIG. 24, the first binary data $f_j$ is context-based adaptive entropy encoded or decoded by a Context-Adaptive Binary Arithmetic Coder or decoder (CABAC).

The context Ctx may be selected by some selection process based at least on the sensing number $N_{sens}(s_j,\lambda_j)$, or optionally on the coordinate difference $C_j$ ($C_{w,j}$) and on the series of binary data $f_{j,n}$, to provide a context index ctxIdx associated with a binary data $f_j$.

A context table Tctx with $N_{ctx}$ entries usually store probabilities associated with the contexts and a probability $p_{ctxIdx}$ is obtained as the ctxIdx-th entry of the context table. The context is selected based on the context index ctxIdx by $$Ctx = Tctx[ctxIdx].$$

For example, the context index ctxIdx may correspond to the sensing number $N_{sens}(s_j,\lambda_j)$, or optionally on the coordinate difference $C_j$ ($C_{w,j}$) and on the series of binary data $f_{j,n}$, such that the context Ctx is selected as $$Ctx = Tctx[N_{sens}(s_j, \lambda_j)] \text{ or } Ctx = Tctx[C_j] \text{ or }$$
$$Ctx = T[C_{w,j}] \text{ or } Ctx = T[C_{w,j}, f_{j,n}].$$

A binary data $f_j$ is entropy encoded in the bitstream B, respectively entropy decoded from the bitstream B, using the probability $p_{ctxIdx}$.

Entropy coders are usually arithmetic coders but may be any other type of entropy coders like asymmetric numeral systems. In any case, optimal coders add $-\log 2(p_{ctxIdx})$ bits in the bitstream B to encode $f_j$=1 or $-\log 2(1-p_{ctxIdx})$ bits in the bitstream B to encode $f_j$=0. Once the binary data $f_j$ is encoded (decoded) the probability $p_{ctxIdx}$ is updated by using an updater taking the encoded binary data $f_j$ and $p_{ctxIdx}$ as entries; the updater is usually performed by using updated tables. The updated probability replaces the ctxIdx-th entry of the context table Tctx. Then, another binary data $f_j$ can be encoded, and so on. The update loop back to the context table is a bottleneck in the coding workflow as another symbol can be encoded only after the update has been performed. For this reason, the memory access to the context table must be as quick as possible and minimizing the size of the context table helps easing its hardware implementation.

A Context-Adaptive Binary Arithmetic decoder performs essentially the same operations as the Context-Adaptive Binary Arithmetic encoder except that the coded binary data $f_j$ is decoded from the bitstream B by an entropy decoder using the probability $p_{ctxIdx}$.

Selecting an adequate context, i.e. the probability $p_{ctxIdx}$ that estimates at best the chance of the binary data $f_j$ to be equals to 1, is essential to obtain good compression. Therefore, the context selection should use the occupancy data of at least one neighboring coarse point belonging to a causal neighborhood of a current occupied coarse point, and correlation between them to obtain this adequate context.

Figure 25:
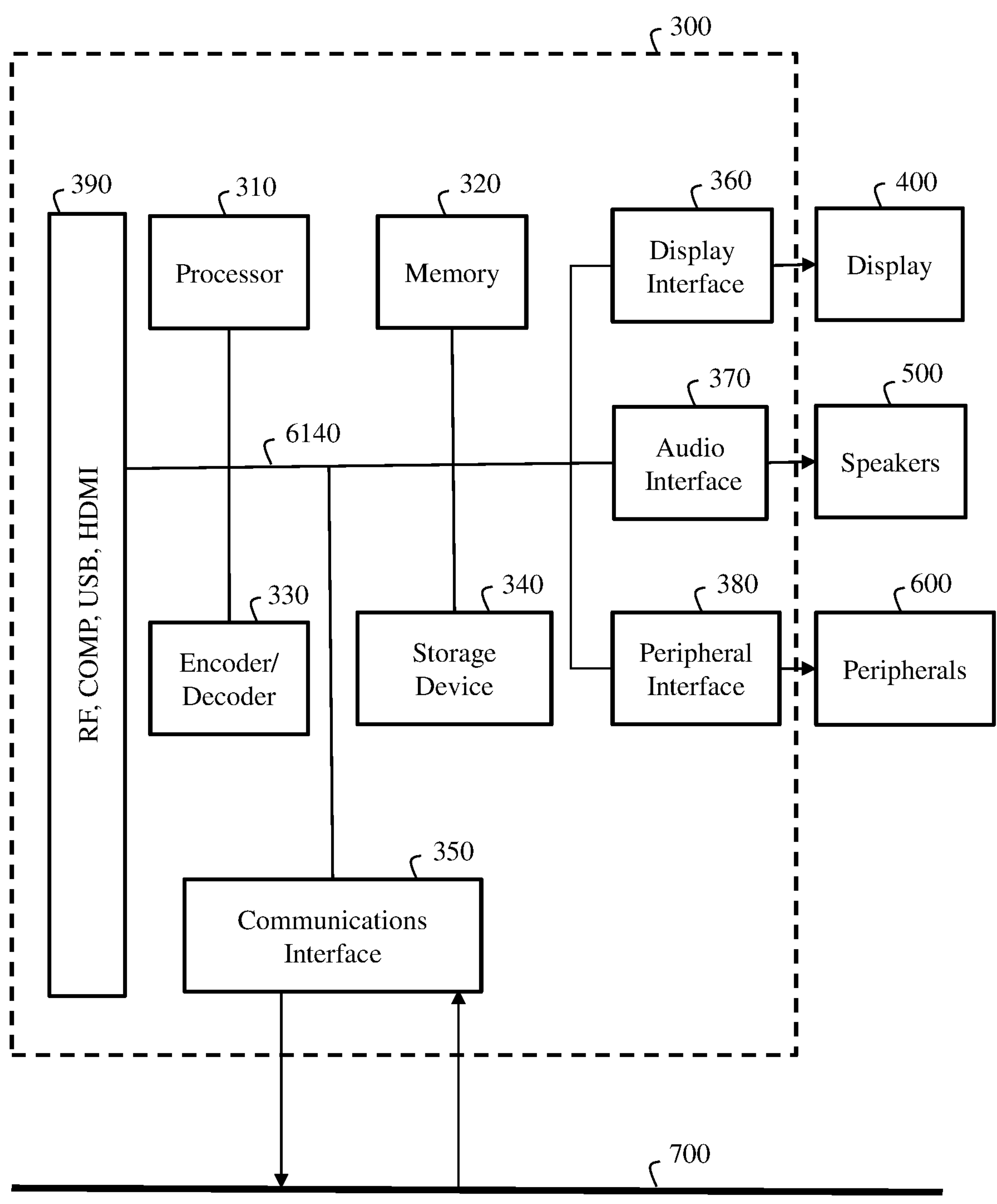
FIG. 25 illustrates a schematic block diagram of an example of a system in which various aspects and embodiments are implemented.

FIG. 25 shows a schematic block diagram illustrating an example of a system in which various aspects and embodiments are implemented.

System 300 may be embedded as one or more devices including the various components described below. In various embodiments, the system 300 may be configured to implement one or more of the aspects described in the disclosure.

Examples of equipment that may form all or part of the system 300 include personal computers, laptops, smartphones, tablet computers, digital multimedia set top boxes, digital television receivers, personal video recording systems, connected home appliances, connected vehicles and their associated processing systems, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. Elements of system 300, singly or in combination, may be embodied in a single integrated circuit (IC), multiple ICs, and/or discrete components. For example, in at least one embodiment, the processing and encoder/decoder elements of system 300 may be distributed across multiple ICs and/or discrete components. In various embodiments, the system 300 may be communicatively coupled to other similar systems, or to other electronic devices, via, for example, a communications bus or through dedicated input and/or output ports.

The system 300 may include at least one processor 310 configured to execute instructions loaded therein for implementing, for example, the various aspects described in the disclosure. Processor 310 may include embedded memory, input output interface, and various other circuitries as known in the art. The system 300 may include at least one memory 320 (for example a volatile memory device and/or a non-volatile memory device). System 300 may include a storage device 340, which may include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (RAM), Dynamic Random-Access Memory (DRAM), Static Random-Access Memory (SRAM), flash, magnetic disk drive, and/or optical disk drive. The storage device 340 may include an internal storage device, an attached storage device, and/or a network accessible storage device, as non-limiting examples.

The system 300 may include an encoder/decoder module 330 configured, for example, to process data to provide encoded/decoded point cloud geometry data, and the encoder/decoder module 330 may include its own processor and memory. The encoder/decoder module 330 may represent module(s) that may be included in a device to perform the encoding and/or decoding functions. As is known, a device may include one or both encoding and decoding modules. Additionally, encoder/decoder module 330 may be implemented as a separate element of system 300 or may be incorporated within processor 310 as a combination of hardware and software as known to those skilled in the art.

Program code to be loaded onto processor 310 or encoder/decoder 330 to perform the various aspects described in the disclosure may be stored in storage device 340 and subsequently loaded onto memory 320 for execution by processor 310. In accordance with various embodiments, one or more of processor 310, memory 320, storage device 340, and encoder/decoder module 330 may store one or more of various items during the performance of the processes described in the disclosure. Such stored items may include, but are not limited to, a point cloud frame, encoded/decoded geometry/attributes videos/images or portions of the encoded/decoded geometry/attribute video/images, a bitstream, matrices, variables, and intermediate or final results from the processing of equations, formulas, operations, and operational logic.

In several embodiments, memory inside of the processor 310 and/or the encoder/decoder module 330 may be used to store instructions and to provide working memory for processing that may be performed during encoding or decoding.

In other embodiments, however, a memory external to the processing device (for example, the processing device may be either the processor 310 or the encoder/decoder module 330) may be used for one or more of these functions. The external memory may be the memory 320 and/or the storage device 340, for example, a dynamic volatile memory and/or a non-volatile flash memory. In several embodiments, an external non-volatile flash memory may be used to store the operating system of a television. In at least one embodiment, a fast external dynamic volatile memory such as a RAM may be used as working memory for video coding and decoding operations, such as for MPEG-2 part 2 (also known as ITU-T Recommendation H.262 and ISO/IEC 13818-2, also known as MPEG-2 Video), HEVC (High Efficiency Video coding), VVC (Versatile Video Coding), or MPEG-I part 5 or part 9.

The input to the elements of system 300 may be provided through various input devices as indicated in block 390. Such input devices include, but are not limited to, (i) an RF portion that may receive an RF signal transmitted, for example, over the air by a broadcaster, (ii) a Composite input terminal, (iii) a USB input terminal, and/or (iv) an HDMI input terminal.

In various embodiments, the input devices of block 390 may have associated respective input processing elements as known in the art. For example, the RF portion may be associated with elements necessary for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which may be referred to as a channel in certain embodiments, (iv) demodulating the down-converted and band-limited signal, (v) performing error correction, and (vi) demultiplexing to select the desired stream of data packets. The RF portion of various embodiments may include one or more elements to perform these functions, for example, frequency selectors, signal selectors, band-limiters, channel selectors, filters, downconverters, demodulators, error correctors, and de-multiplexers. The RF portion may include a tuner that performs various of these functions, including, for example, down-converting the received signal to a lower frequency (for example, an intermediate frequency or a near-baseband frequency) or to baseband.

In one set-top box embodiment, the RF portion and its associated input processing element may receive an RF signal transmitted over a wired (for example, cable) medium. Then, the RF portion may perform frequency selection by filtering, down-converting, and filtering again to a desired frequency band.

Various embodiments rearrange the order of the above-described (and other) elements, remove some of these elements, and/or add other elements performing similar or different functions.

Adding elements may include inserting elements in between existing elements, such as, for example, inserting amplifiers and an analog-to-digital converter. In various embodiments, the RF portion may include an antenna.

Additionally, the USB and/or HDMI terminals may include respective interface processors for connecting system 300 to other electronic devices across USB and/or HDMI connections. It is to be understood that various aspects of input processing, for example, Reed-Solomon error correction, may be implemented, for example, within a separate input processing IC or within processor 310 as necessary. Similarly, aspects of USB or HDMI interface processing may be implemented within separate interface ICs or within processor 310 as necessary. The demodulated, error corrected, and demultiplexed stream may be provided to various processing elements, including, for example, processor 310, and encoder/decoder 330 operating in combination with the memory and storage elements to process the data stream as necessary for presentation on an output device.

Various elements of system 300 may be provided within an integrated housing. Within the integrated housing, the various elements may be interconnected and transmit data therebetween using suitable connection arrangement 390, for example, an internal bus as known in the art, including the I2C bus, wiring, and printed circuit boards.

The system 300 may include communication interface 350 that enables communication with other devices via communication channel 700. The communication interface 350 may include, but is not limited to, a transceiver configured to transmit and to receive data over communication channel 700. The communication interface 350 may include, but is not limited to, a modem or network card and the communication channel 700 may be implemented, for example, within a wired and/or a wireless medium.

Data may be streamed to the system 300, in various embodiments, using a Wi-Fi network such as IEEE 802.11. The Wi-Fi signal of these embodiments may be received over the communications channel 700 and the communications interface 350 which are adapted for Wi-Fi communications. The communications channel 700 of these embodiments may be typically connected to an access point or router that provides access to outside networks including the Internet for allowing streaming applications and other over-the-top communications.

Other embodiments may provide streamed data to the system 300 using a set-top box that delivers the data over the HDMI connection of the input block 390.

Still other embodiments may provide streamed data to the system 300 using the RF connection of the input block 390.

The streamed data may be used as a way for signaling information used by the system 300. The signaling information may comprise the bitstream B and/or information such a number of points of a point cloud, coordinates and/or sensor setup parameters.

It is to be appreciated that signaling may be accomplished in a variety of ways. For example, one or more syntax elements, flags, and so forth may be used to signal information to a corresponding decoder in various embodiments.

The system 300 may provide an output signal to various output devices, including a display 400, speakers 500, and other peripheral devices 600. The other peripheral devices 600 may include, in various examples of embodiments, one or more of a stand-alone DVR, a disk player, a stereo system, a lighting system, and other devices that provide a function based on the output of the system 300.

In various embodiments, control signals may be communicated between the system 300 and the display 400, speakers 500, or other peripheral devices 600 using signaling such as AV.Link (Audio/Video Link), CEC (Consumer Electronics Control), or other communications protocols that enable device-to-device control with or without user intervention.

The output devices may be communicatively coupled to system 300 via dedicated connections through respective interfaces 360, 370, and 380.

Or, the output devices may be connected to system 300 using the communications channel 700 via the communications interface 350. The display 400 and speakers 500 may be integrated in a single unit with the other components of system 300 in an electronic device such as, for example, a television.

In various embodiments, the display interface 360 may include a display driver, such as, for example, a timing controller (T Con) chip.

The display 400 and speaker 500 may be separate from one or more of the other components, for example, if the RF portion of input 390 is part of a separate set-top box. In various embodiments in which the display 400 and speakers 500 may be external components, the output signal may be provided via dedicated output connections, including, for example, HDMI ports, USB ports, or COMP outputs.

In FIGS. 1-25, various methods are described herein, and each of the methods includes one or more steps or actions for achieving the described method. Unless a specific order of steps or actions is required for proper operation of the method, the order and/or use of specific steps and/or actions may be modified or combined.

Some examples are described with regard to block diagrams and/or operational flowcharts. Each block represents a circuit element, module, or portion of code which includes one or more executable instructions for implementing the specified logical function(s). It should also be noted that in other implementations, the function(s) noted in the blocks may occur out of the indicated order. For example, two blocks shown in succession may, in fact, be executed substantially concurrently or the blocks may sometimes be executed in the reverse order, depending on the functionality involved.

The implementations and aspects described herein may be implemented in, for example, a method or a process, an apparatus, a computer program, a data stream, a bitstream, or a signal. Even if only discussed in the context of a single form of implementation (for example, discussed only as a method), the implementation of features discussed may also be implemented in other forms (for example, an apparatus or computer program).

The methods may be implemented in, for example, a processor, which refers to processing devices in general, including, for example, a computer, a microprocessor, an integrated circuit, or a programmable logic device. Processors also include communication devices.

Additionally, the methods may be implemented by instructions being performed by a processor, and such instructions (and/or data values produced by an implementation) may be stored on a computer readable storage medium. A computer readable storage medium may take the form of a computer readable program product embodied in one or more computer readable medium(s) and having computer readable program code embodied thereon that is executable by a computer. A computer readable storage medium as used herein may be considered a non-transitory storage medium given the inherent capability to store the information therein as well as the inherent capability to provide retrieval of the information therefrom. A computer readable storage medium may be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present embodiments may be applied, is merely an illustrative and not an exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

An apparatus may be implemented in, for example, appropriate hardware, software, and firmware. Examples of such apparatus include personal computers, laptops, smartphones, tablet computers, digital multimedia set top boxes, digital television receivers, personal video recording systems, connected home appliances, head mounted display devices (HMD, see-through glasses), projectors (beamers), "caves" (system including multiple displays), servers, video encoders, video decoders, post-processors processing output from a video decoder, pre-processors providing input to a video encoder, web servers, set-top boxes, and any other device for processing a point cloud, a video or an image or other communication devices. As should be clear, the equipment may be mobile and even installed in a mobile vehicle.

Computer software may be implemented by the processor 310 or by hardware, or by a combination of hardware and software. As a non-limiting example, the embodiments may be also implemented by one or more integrated circuits. The memory 320 may be of any type appropriate to the technical environment and may be implemented using any appropriate data storage technology, such as optical memory devices, magnetic memory devices, semiconductor-based memory devices, fixed memory, and removable memory, as non-limiting examples. The processor 310 may be of any type appropriate to the technical environment, and may encompass one or more of microprocessors, general purpose computers, special purpose computers, and processors based on a multi-core architecture, as non-limiting examples.

As will be evident to one of ordinary skill in the art, implementations may produce a variety of signals formatted to carry information that may be, for example, stored or transmitted. The information may include, for example, instructions for performing a method, or data produced by one of the described implementations. For example, a signal may be formatted to carry the bitstream of a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

The terminology used herein is for the purpose of describing particular embodiments only and is not intended to be limiting. As used herein, the singular forms "a", "an", and "the" may be intended to include the plural forms as well, unless the context clearly indicates otherwise. It will be further understood that the terms "includes/comprises" and/or "including/comprising" when used in this specification, may specify the presence of stated, for example, features, integers, steps, operations, elements, and/or components but do not preclude the presence or addition of one or more other features, integers, steps, operations, elements, components, and/or groups thereof. Moreover, when an element is referred to as being "responsive" or "connected" to another element, it may be directly responsive or connected to the other element, or intervening elements may be present. In contrast, when an element is referred to as being "directly responsive" or "directly connected" to other element, there are no intervening elements present.

It is to be appreciated that the use of any of the symbol/term "/", "and/or", and "at least one of", for example, in the cases of "A/B", "A and/or B" and "at least one of A and B", may be intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as is clear to one of ordinary skill in this and related arts, for as many items as are listed.

Various numeric values may be used in the disclosure. The specific values may be for example purposes and the aspects described are not limited to these specific values.

It will be understood that, although the terms first, second, etc. may be used herein to describe various elements, these elements are not limited by these terms. These terms are only used to distinguish one element from another. For example, a first element could be termed a second element, and, similarly, a second element could be termed a first element without departing from the teachings of this application. No ordering is implied between a first element and a second element.

Reference to "one embodiment" or "an embodiment" or "some embodiments" or "one implementation" or "an implementation", as well as other variations thereof, is frequently used to convey that a particular feature, structure, characteristic, and so forth (described in connection with the embodiment/implementation) is included in at least one embodiment/implementation. Thus, the appearances of the phrase "in one embodiment" or "in an embodiment" or "in some embodiments" or "in one implementation" or "in an implementation", as well any other variations, appearing in various places throughout this application are not necessarily all referring to the same embodiment.

Similarly, reference herein to "in accordance with an embodiment/example/implementation" or "in an embodiment/example/implementation", as well as other variations thereof, is frequently used to convey that a particular feature, structure, or characteristic (described in connection with the embodiment/example/implementation) may be included in at least one embodiment/example/implementation. Thus, the appearances of the expression "in accordance with an embodiment/example/implementation" or "in an embodiment/example/implementation" in various places in the specification are not necessarily all referring to the same embodiment/example/implementation, nor are separate or alternative embodiment/examples/implementation necessarily mutually exclusive of other embodiments/examples/implementation.

Reference numerals appearing in the claims are by way of illustration only and shall have no limiting effect on the scope of the claims. Although not explicitly described, the present embodiments/examples and variants may be employed in any combination or sub-combination.

When a figure, is presented as a flow diagram, it should be understood that it also provides a block diagram of a corresponding apparatus. Similarly, when a figure is presented as a block diagram, it should be understood that it also provides a flow diagram of a corresponding method/process.

Although some of the diagrams include arrows on communication paths to show a primary direction of communication, it is to be understood that communication may occur in the opposite direction to the depicted arrows.

Various implementations involve decoding. "Decoding", as used in this application, may encompass all or part of the processes performed, for example, on a received point cloud frame (including possibly a received bitstream which encodes one or more point cloud frames) in order to produce a final output suitable for display or for further processing in the reconstructed point cloud domain. In various embodiments, such processes include one or more of the processes typically performed by a decoder. In various embodiments, such processes also, or include processes performed by a decoder of various implementations described in this application, for example, As further examples, in one embodiment "decoding" may refer only to de-quantizing, in one embodiment "decoding" may refer to entropy decoding, in another embodiment "decoding" may refer only to differential decoding, and in another embodiment "decoding" may refer to combinations of de-quantizing, entropy decoding and differential decoding. Whether the phrase "decoding process" may be intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application may encompass all or part of the processes performed, for example, on an input point cloud frame in order to produce an encoded bitstream. In various embodiments, such processes include one or more of the processes typically performed by an encoder. In various embodiments, such processes also, or include processes performed by an encoder of various implementations described in this application.

As further examples, in one embodiment "encoding" may refer only to quantizing, in one embodiment "encoding" may refer only to entropy encoding, in another embodiment "encoding" may refer only to differential encoding, and in another embodiment "encoding" may refer to combinations of quantizing, differential encoding and entropy encoding. Whether the phrase "encoding process" may be intended to refer specifically to a subset of operations or generally to the broader encoding process will be clear based on the context of the specific descriptions and is believed to be well understood by those skilled in the art.

Additionally, this application may refer to "obtaining" various pieces of information. Obtaining the information may include one or more of, for example, estimating the information, calculating the information, predicting the information, or retrieving the information from memory.

Further, this application may refer to "accessing" various pieces of information. Accessing the information may include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

Also, as used herein, the word "signal" refers to, among other things, indicating something to a corresponding decoder. For example, in certain embodiments the encoder signals a particular information such a number of points of the point cloud or coordinates or sensor setup parameters. In this way, in an embodiment the same parameter may be used at both the encoder side and the decoder side. Thus, for example, an encoder may transmit (explicit signaling) a particular parameter to the decoder so that the decoder may use the same particular parameter. Conversely, if the decoder already has the particular parameter as well as others, then signaling may be used without transmitting (implicit signaling) to simply allow the decoder to know and select the particular parameter. By avoiding transmission of any actual functions, a bit savings is realized in various embodiments. It is to be appreciated that signaling may be accomplished in a variety of ways. For example, one or more syntax elements, flags, and so forth are used to signal information to a corresponding decoder in various embodiments. While the preceding relates to the verb form of the word "signal", the word "signal" may also be used herein as a noun.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method of encoding, into a bitstream, point cloud geometry data represented by ordered coarse points occupying some discrete positions of a set of discrete positions of a two-dimensional space, wherein the method comprises obtaining at least one binary data ($f_j$) representative of an order index difference representative of a difference between order indices of two consecutive occupied coarse points and encoding each of the at least one binary data ($f_j$) by:

obtaining coordinates ($s_j,\lambda_j$) of a current coarse point ($P_j$) within the two-dimensional space;

obtaining a sensing number ($N_{sens}(s_j,\lambda_j)$) from the current coarse point ($P_j$), the sensing number ($N_{sens}(s_j,\lambda_j)$) being representative of an average number of consecutive sensing needed by a sensor ($\lambda_j$) associated with the current coarse point ($P_j$) to sense another coarse point; and entropy encoding, into the bitstream, the binary data ($f_j$) based on the sensing number ($N_{sens}(s_j,\lambda_j)$).

2. A method of decoding, from a bitstream, point cloud geometry data represented by ordered coarse points occupying some discrete positions of a set of discrete positions of a two-dimensional space, wherein the method comprises obtaining at least one binary data ($f_j$) representative of an order index difference representative of a difference between order indices of two consecutive occupied coarse points by:

obtaining coordinates of a current coarse point ($P_j$) within the two-dimensional space;

obtaining a sensing number ($N_{sens}(s_j,\lambda_j)$) from the current coarse point ($P_j$), the sensing number ($N_{sens}(s_j,\lambda_j)$) being representative of an average number of consecutive sensing needed by a sensor ($\lambda_j$) associated with the current coarse point ($P_j$) to sense another coarse point; and entropy decoding, into the bitstream, the binary data ($f_j$) based on the sensing number ($N_{sens}(s_j,\lambda_j)$).

3. The method of claim 1, wherein entropy encoding the binary data ($f_j$) is based on the sensing number ($N_{sens}(s_j,\lambda_j)$) in response to the sensing number ($N_{sens}(s_j, \lambda_j)$) being greater than an activation threshold ($th_{activation}$); or based on at least a coordinate difference ($C_j$) between one first coordinate associated with the current coarse point ($P_j$) and one first coordinate of a preceding encoded or decoded coarse point ($P_{prec}$) with a same sensor index as a sensor index ($\lambda_j$) associated with the current coarse point, in response to the sensing number ($N_{sens}(s_j, \lambda_j)$) not being greater than the activation threshold ($th_{activation}$).

4. The method of claim 1, wherein entropy encoding the binary data ($f_j$) is based on a value ($\Delta_j$) depending on a sample index ($s_j$), another sample index ($s_{last}$) associated with a sensing time instant at which a point of the point cloud, represented by a last occupied coarse point ($P_{last}$), has been sensed by the sensor associated with the sensor index ($\lambda_j$), and the sensing number ($N_{sens}(s_j,\lambda_j)$).

5. The method of claim 4, wherein the value ($\Delta_j$) is bounded by two thresholds.

6. The method of claim 1, wherein the sensing number ($N_{sens}(s_j,\lambda_j)$) depends on at least one of a radius ($r_{object}$) or an azimuthal angle ($\phi_{last}$) associated with a last occupied coarse point ($P_{last}$) representing a point of the point cloud sensed by the sensor ($\lambda_j$) associated with the current coarse point ($P_j$).

7. The method of claim 1, wherein the sensing number ($N_{sens}(s_j,\lambda_j)$) depends on a point cloud characteristic distance ($L_{PC}$), defining a mean distance between points of the point cloud, and on an arc length ($L_{arc}$) defined in a two-dimensional cartesian coordinate plane between two consecutive sensing by the sensor associated with the current coarse point.

8. The method of claim 7, wherein the arc length ($L_{arc}$) is based on a radius associated with a last occupied coarse point ($P_{last}$) representing a point of the point cloud sensed by the sensor associated with the current coarse point and an azimuthal shift between two consecutive sensing.

9. The method of claim 7, wherein the point cloud characteristic distance ($L_{PC}$) is encoded into the bitstream.

10. An apparatus of encoding, into a bitstream, point cloud geometry data represented by ordered coarse points occupying some discrete positions of a set of discrete positions of a two-dimensional space, wherein the apparatus comprises at least one processor configured to obtain at least one binary data ($f_j$) representative of an order index difference representative of a difference between order indices of two consecutive occupied coarse points and encoding each of the at least one binary data ($f_j$) by:

obtaining coordinates ($s_j,\lambda_j$) of a current coarse point ($P_j$) within the two-dimensional space;

obtaining a sensing number ($N_{sens}(s_j,\lambda_j)$ from the current coarse point ($P_j$), the sensing number ($N_{sens}(s_j,\lambda_j)$) being representative of an average number of consecutive sensing needed by a sensor ($\lambda_j$) associated with the current coarse point ($P_j$) to sense another coarse point; and entropy encoding, into the bitstream, the binary data ($f_j$) based on the sensing number ($N_{sens}(s_j,\lambda_j)$).

11. An apparatus of decoding, from a bitstream, point cloud geometry data represented by ordered coarse points occupying some discrete positions of a set of discrete positions of a two-dimensional space, wherein the apparatus comprises at least one processor configured to perform the method of claim 2.

12. A non-transitory computer-readable storage medium carrying instructions of program code for executing the method of claim 1.

13. A non-transitory computer-readable storage medium carrying instructions of program code for executing the method of claim 2.

14. The method of claim 2, wherein entropy decoding the binary data ($f_j$) is based on the sensing number ($N_{sens}(s_j,\lambda_j)$) in response to the sensing number ($N_{sens}(s_j, \lambda_j)$ being greater than an activation threshold ($th_{activation}$); or based on at least a coordinate difference ($C_j$) between one first coordinate associated with the current coarse point ($P_j$) and one first coordinate of a preceding encoded or decoded coarse point ($P_{prec}$) with a same sensor index as a sensor index ($\lambda_j$) associated with the current coarse point, in response to the sensing number ($N_{sens}(s_j,\lambda_j)$) not being greater than the activation threshold ($th_{activation}$).

15. The method of claim 2, wherein entropy decoding the binary data ($f_j$) is based on a value ($\Delta_j$) depending on a sample index ($s_j$), another sample index ($s_{last}$) associated with a sensing time instant at which a point of the point cloud, represented by a last occupied coarse point ($P_{last}$), has been sensed by the sensor associated with the sensor index ($\lambda_j$), and the sensing number ($N_{sens}(s_j,\lambda_j)$).

16. The method of claim 15, wherein the value ($\Delta_j$) is bounded by two thresholds.

17. The method of claim 2, wherein the sensing number ($N_{sens}(s_j,\lambda_j)$) depends on at least one of a radius ($r_{object}$) or an azimuthal angle ($P_{last}$) associated with a last occupied coarse point ($P_{last}$) representing a point of the point cloud sensed by the sensor ($\lambda_j$) associated with the current coarse point ($P_j$).

18. The method of claim 2, wherein the sensing number ($N_{sens}(s_j,\lambda_j)$) depends on a point cloud characteristic distance ($L_{PC}$), defining a mean distance between points of the point cloud, and on an arc length ($L_{arc}$) defined in a two-dimensional cartesian coordinate plane between two consecutive sensing by the sensor associated with the current coarse point.

19. The method of claim 18, wherein the arc length ($L_{arc}$) is based on a radius associated with a last occupied coarse point ($P_{last}$) representing a point of the point cloud sensed by the sensor associated with the current coarse point and an azimuthal shift between two consecutive sensing.

20. The method of claim 18, wherein the point cloud characteristic distance ($L_{PC}$) is encoded into the bitstream.

* * * * *